US011662601B2

(12) United States Patent
Filhaber

(10) Patent No.: US 11,662,601 B2
(45) Date of Patent: May 30, 2023

(54) FLEXURE ARRANGEMENTS FOR OPTICAL COMPONENTS

(71) Applicant: COGNEX CORPORATION, Natick, MA (US)

(72) Inventor: John Filhaber, East Haddam, CT (US)

(73) Assignee: COGNEX CORPORATION, Natick, MA (US)

( * ) Notice: Subject to any disclaimer, the term of this patent is extended or adjusted under 35 U.S.C. 154(b) by 307 days.

(21) Appl. No.: 17/089,526

(22) Filed: Nov. 4, 2020

(65) Prior Publication Data

US 2022/0137426 A1 May 5, 2022

(51) Int. Cl.
G02B 27/62 (2006.01)
G02B 7/00 (2021.01)
G02B 7/02 (2021.01)
B29C 65/54 (2006.01)
B29C 65/78 (2006.01)

(52) U.S. Cl.
CPC ............ G02B 27/62 (2013.01); B29C 65/542 (2013.01); B29C 65/7802 (2013.01); G02B 7/004 (2013.01); G02B 7/023 (2013.01); G02B 7/025 (2013.01)

(58) Field of Classification Search
CPC ........ G02B 7/004; G02B 7/023; G02B 7/025; G02B 27/62; B29C 65/542; B29C 65/7802; B29C 65/56; B29C 65/562; B29C 65/564; B29C 65/60; B29C 65/601; B29C 65/605; B29C 65/72
USPC ..... 156/60, 91, 99, 182, 242, 245, 290, 291, 156/307.1; 385/60, 147, 51, 78; 359/811, 819, 822, 900
See application file for complete search history.

(56) References Cited

U.S. PATENT DOCUMENTS

| 6,674,585 | B1 | 1/2004 | Calvet et al. |
| 6,754,013 | B2 | 6/2004 | Willis |
| 9,891,402 | B2 | 2/2018 | Erbe et al. |
| 9,897,772 | B2 | 2/2018 | Hong et al. |
| 2002/0060200 | A1 | 5/2002 | Shu et al. |
| 2005/0178934 | A1 | 8/2005 | Hacker et al. |
| 2012/0066887 | A1* | 3/2012 | Garris ............... G02B 23/12 29/525.01 |
| 2012/0120308 | A1 | 5/2012 | Gutierrez et al. |

(Continued)

OTHER PUBLICATIONS

PCT International Search Report and Written Opinion, PCT/US2021/057212, dated Feb. 8, 2022, 12 pages.

(Continued)

*Primary Examiner* — Philip C Tucker
*Assistant Examiner* — Brian R Slawski
(74) *Attorney, Agent, or Firm* — Quarles & Brady LLP

(57) ABSTRACT

An optical system can include a receiver secured to a first optical component and a flexure arrangement secured to a second optical component. The flexure arrangement can include a plurality of flexures, each with a free end that can extend away from the second optical component and into a corresponding cavity of the receiver. Each of the cavities can be sized to receive adhesive that secures the corresponding flexure within the cavity when the adhesive has hardened, and to permit adjustment of the corresponding flexure within the cavity, before the adhesive has hardened, to adjust an alignment of the first and second optical components relative to multiple degrees of freedom.

20 Claims, 13 Drawing Sheets

(56) References Cited

U.S. PATENT DOCUMENTS

2012/0200946 A1* 8/2012 Wippermann ......... G02B 7/028
                                                    156/99
2017/0235085 A1* 8/2017 Erbe ....................... G02B 7/00
                                                    248/315
2020/0064580 A1   2/2020 Foes et al.

OTHER PUBLICATIONS

Yoder, "Mounting Small Mirrors/Prisms", Opto-Mechanical Systems Design, Second Edition, 1993, pp. 306-307, 316-317, Copyright by Marcel Dekker, Inc.

* cited by examiner

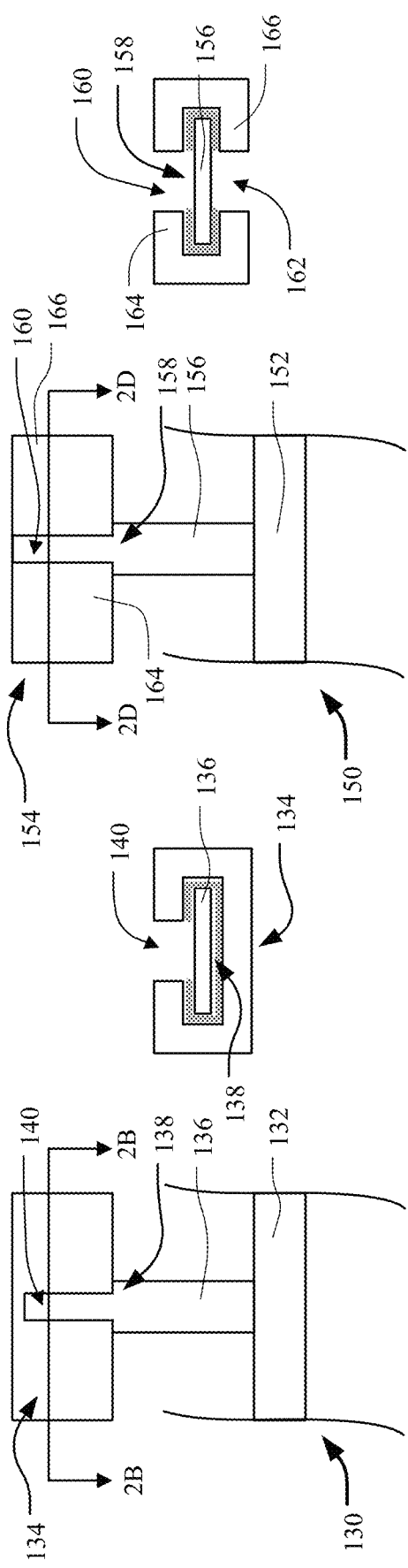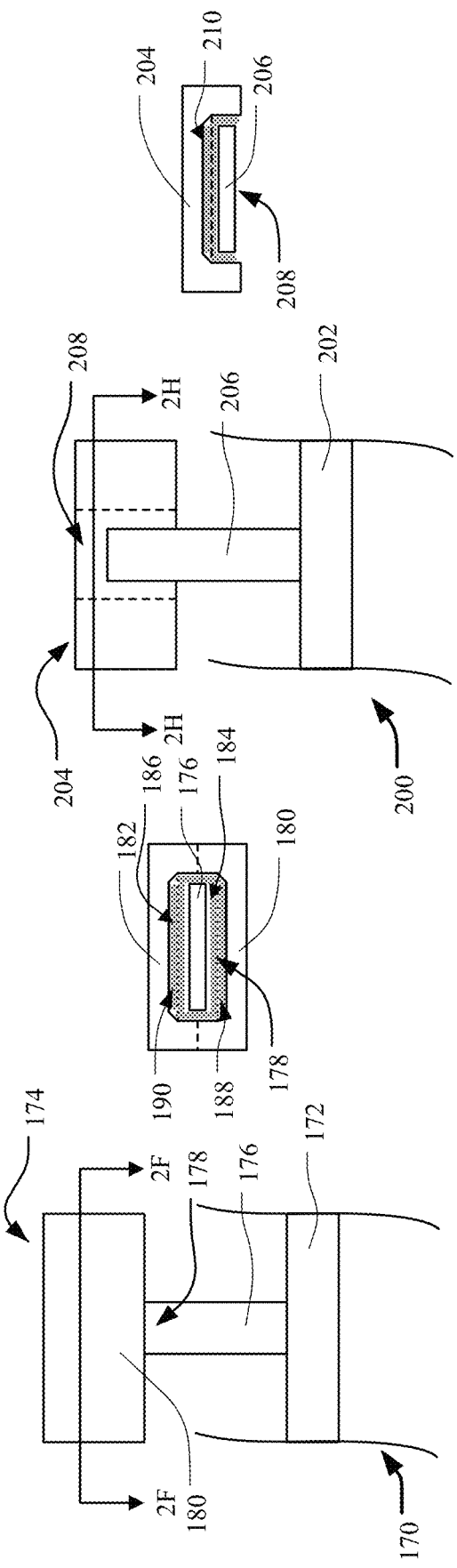

FLEXURE ARRANGEMENTS FOR OPTICAL COMPONENTS

CROSS-REFERENCE TO RELATED APPLICATIONS

Not applicable.

STATEMENT REGARDING FEDERALLY SPONSORED RESEARCH

Not applicable.

BACKGROUND

Flexures have been utilized in optical systems to provide varying degrees of stability and movement for optical components within the specific optical system. For example, flexures can provide a resilient interface between the optical components coupled thereto, providing advantages for the optical system including absorption of transient stresses to adjustments in orientation for the optical component coupled thereto.

SUMMARY

Some embodiments of the disclosure provide an optical system. The optical system can include a receiver that can include a receiver body secured to a first optical component. The receiver can further include a first pocket block, a second pocket block, and a third pocket block that extend from the receiver body and can include a first pocket, a second pocket, and a third pocket, respectively. The optical system can include a flexure arrangement that can include a flexure base secured to a second optical component. The flexure arrangement can further include a first flexure, a second flexure, and a third flexure that extend from the flexure base into the first, second, and third pockets, respectively, and are secured therein with adhesive. Each of the first, second, and third pockets can be sized to permit adjustment of the corresponding first, second, or third flexure within the pocket along multiple axes before the adhesive has hardened or prior to insertion of the adhesive, to adjust an alignment of the first and second optical components relative to multiple degrees of freedom.

Some embodiments of the disclosure provide an optical system. The optical system can include a receiver secured to a first optical component. The receiver can include a receiver body that supports the first optical component and a plurality of slots. The optical system can include a flexure arrangement secured to a second optical component. The flexure arrangement can include a plurality of flexures, each with a free end that can extend away from the second optical component and into a corresponding one of the slots. Each of the slots can be sized to receive adhesive that secures the corresponding flexure within the slot when the adhesive has hardened, and to permit adjustment of the corresponding flexure within the slot, before the adhesive has hardened, to adjust an alignment of the first and second optical components relative to multiple degrees of freedom.

Some embodiments of the disclosure can provide an optical system. The optical system can include a receiver secured to a first optical component. The receiver can include a receiver body that supports the first optical component, and a plurality of cavities. The optical system can include a flexure arrangement secured to a second optical component. The flexure arrangement can include a plurality of flexures that extend away from the second optical component to be nested within the cavities. Each of the cavities can include adhesive that is hardened to secure the corresponding flexure within the cavity. Each of the cavities can have a cross-section that is larger than a cross-section of the corresponding flexure and a depth in an insertion direction that is larger than an insertion length for the corresponding flexure, so that the corresponding flexure is adjustable relative to multiple degrees of freedom within the cavity, while remaining nested within the cavity, before the adhesive is hardened.

In some embodiments, one or more flexures can extend substantially perpendicularly from a flexure base.

In some embodiments, one or more pocket blocks (or other protrusions) can extend substantially perpendicularly from a receiver body. One or more cavities to receive a corresponding flexure can be formed in the one or more pocket blocks (or other protrusions).

In some embodiments, one or more (e.g., each) pocket or other cavity can have an elongate cross-section perpendicular to an insertion direction for a corresponding flexure. A cross-section can be configured to adjustably receive a planar portion of the corresponding flexure or can otherwise correspond to a cross-section (e.g., an elongate cross-section) of a flexure.

In some embodiments, a well can be formed within one or more pockets or other cavities, sized to receive adhesive to provide at least a minimum bond line thickness for the adhesive, to secure a corresponding flexure. In some embodiments, a well can be formed on a side wall of a pocket (or other cavity).

In some embodiments, an injection port can be in fluid communication with at least one pocket. An opening can be directed through at least one a flexure that corresponds with the at least one pocket. The injection port, the opening, and a well of the pocket can be aligned (e.g., along an axis defined by the injection port) for passage of adhesive from the injection port, through the opening, to the well.

In some embodiments, a flexure arrangement can include a flexure base with one or more base slots (or other cavities). A free end of one or more corresponding flexures can extend into a corresponding one of the base slots (or other cavities) to be secured to the flexure base. The one or more base slots (or other cavities) can be sized to receive adhesive that secures the corresponding flexure to the flexure base. Additionally or alternatively, the one or more base slots (or other cavities) can be sized to permit adjustment of the corresponding flexure with multiple degrees of freedom.

In some embodiments, a side wall of a cavity can include a recess, within which a corresponding flexure can be nested when received in the cavity.

In some embodiments, a receiver body and one or more protrusions with corresponding cavities can be integrally formed. In some embodiments, a flexure and a flexure base can be integrally formed. In some embodiments a flexure base or receiver body can be an integral part of an optical component.

In some embodiments, a receiver can include a plurality of protrusions, with slots formed as pockets that extend into the protrusions.

In some embodiments, a pocket can be at least partly defined by a wall member that is secured to the receiver body at the corresponding protrusion.

In some embodiments, an open end of a slot or other cavity can open away from a receiver body (i.e., can be configured to receive a component that is moved toward the receiver body).

In some embodiments, at least one flexure can be a planar flexure.

In some embodiments, a receiver can be a first receiver, and a plurality of holes can be a first plurality of holes. The optical system can include a second receiver including a second plurality of holes. The second plurality of holes can be configured to each receive an opposing free end of each flexure of the plurality of flexures.

In some embodiments, a slot can define a pocket that fully surrounds a perimeter of a corresponding flexure.

In some embodiments, an opening can be included within a receiver, separate from an open end of a cavity, and can be configured to receive the adhesive during introduction of the adhesive into the cavity. In some embodiments, an opening can be included on a flexure and can be configured to receive the adhesive during introduction of the adhesive into the cavity. In some embodiments, openings on a flexure and a receiver, to receive adhesive, can be aligned when the flexure is received in a cavity of the receiver.

In some embodiments, a receiver can include another opening, separate from the open end of a cavity, to provide visual access to the adhesive within the pocket (e.g., to inspect for appropriate distribution of the adhesive).

Some embodiments of the disclosure can provide a method of aligning a first component and a second component of an optical system. The method can include inserting, into a plurality of cavities of a receiver that supports the first component, a plurality of flexures of a flexure arrangement that supports the second component. The method can include with the flexures remaining within the cavities, adjusting a collective positioning of the flexures relative to the cavities to adjust an alignment of the first and second components with to each other, relative to a plurality of degrees of freedom. The method can include introducing a first amount of adhesive into the cavities, and while maintaining the adjusted collective positioning of the flexures, curing the first amount of adhesive to fix the flexures within the cavities with the adjusted collective positioning.

In some embodiments, the method can include hardening a second amount of adhesive exterior to cavities prior to curing a first amount of adhesive to maintain flexures within the cavities with an adjusted collective positioning.

In some embodiments, a first amount of adhesive can be introduced into cavities via first openings into the cavities. The method can include verifying an introduction of the first amount of adhesive via second openings into the cavities that are different from the first openings.

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

FIG. 2A shows a schematic illustration of an assembly according to some embodiments of the disclosure.

FIG. 2B is a cross-sectional view of the assembly of FIG. 2A taken along line 2B-2B of FIG. 2A.

FIG. 2C shows a schematic illustration of another assembly according to some embodiments of the disclosure.

FIG. 2D is a cross-sectional view of the assembly of FIG. 2C taken along line 2D-2D of FIG. 2C.

FIG. 2E shows a schematic illustration of another assembly according to some embodiments of the disclosure.

FIG. 2F is a cross-sectional view of the assembly of FIG. 2E taken along line 2F-2F of FIG. 2E.

FIG. 2G shows a schematic illustration of another assembly according to some embodiments of the disclosure.

FIG. 2H is a cross-sectional view of the assembly of FIG. 2G taken along line 2H-2H of FIG. 2G.

DETAILED DESCRIPTION

Figure 1:
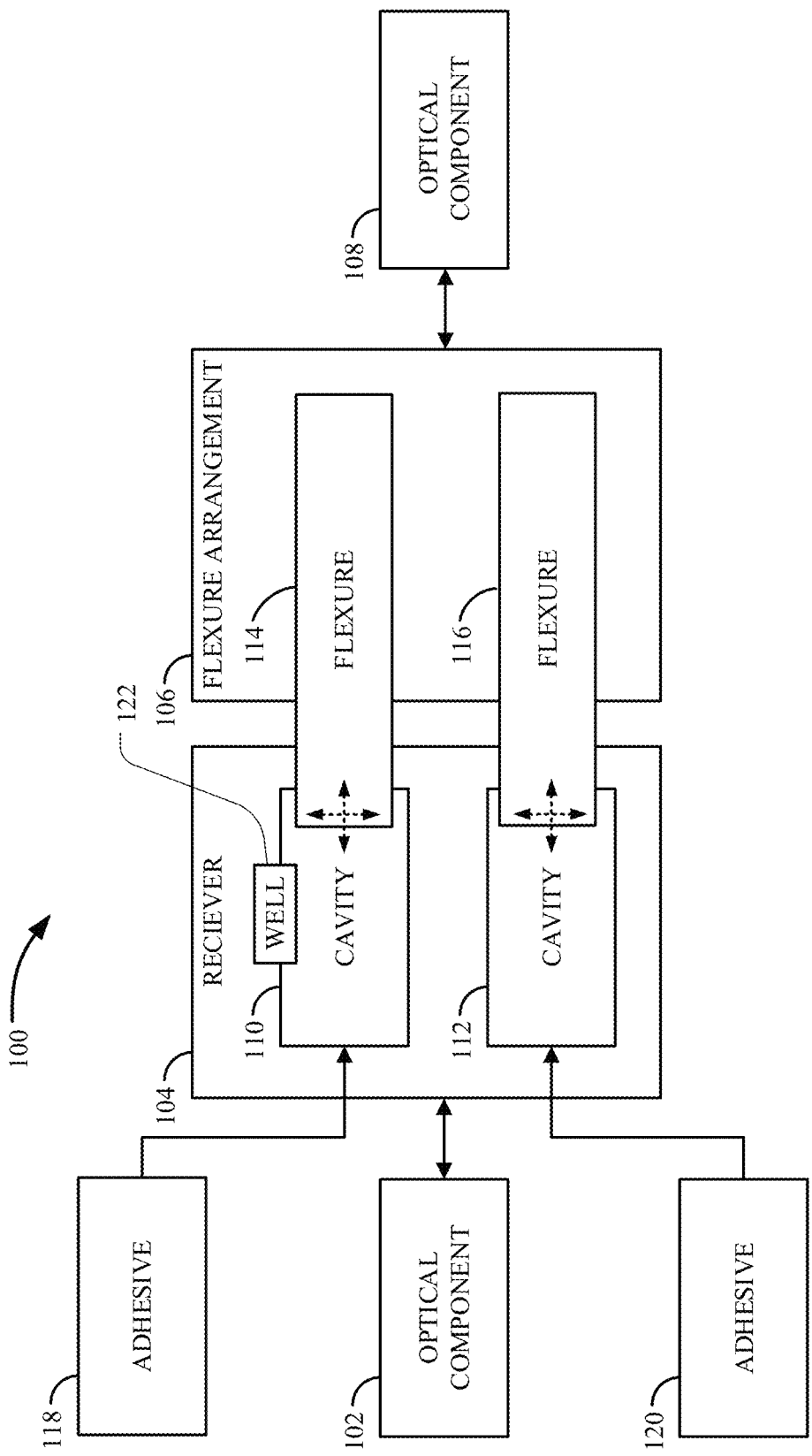
FIG. 1 shows a schematic illustration of an optical system according to some embodiments of the disclosure.

Before any embodiments of the disclosure are explained in detail, it is to be understood that the many embodiments of the disclosure are not limited in their application to the details of construction and the arrangement of components set forth in the following description or illustrated in the following drawings and can be practiced in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "secured," "mounted," "connected," "supported," and "coupled" and variations thereof are used broadly and encompass both direct and indirect mountings, connections, supports, and couplings. Further, "secured," "connected," and "coupled" are not restricted to physical or mechanical connections or couplings.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or front (or other) positions may be used to discuss aspects of a particular example or figure, but do not necessarily require similar orientation or geometry in all installations or configurations. Correspondingly, for example, a "top" feature as described may sometimes be disposed below a "bottom" feature as described (and so on), in some arrangements or embodiments. Further, references to particular rotational or other movements (e.g., counterclockwise rotation) is generally intended as a description only of movement relative a reference frame of a particular example of illustration.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general-purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The following discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

As briefly described above, flexures for optical systems can generally provide varying degrees of flexibility and stability for optical components (e.g., lenses, imaging sensors, projectors or projector targets, etc.) coupled thereto. The specific flexure arrangement that supports an optical component (e.g., the number of flexure arms) can determine how the optical component can move within the optical system. For example, flexure arrangements generally provide a structure that can locally absorb stresses and reliably dissipate those local stresses to return the optical component to its starting (or initial) position. In other words, flexure arrangements can provide a structure that repeatedly returns an optical component to its initial position and orientation by locally allowing movement of particular flexures along particular degrees of freedom without permanent deformations of the flexures (e.g., the flexures largely moving within their elastic regions) or deforming stresses on supported or aligned other components.

In some optical systems, such as those including at least two optical components, it is important that optical components are properly aligned with each other or with other structures. This need for alignment may be especially pronounced for high precision applications. For example, some high precision optical systems require that deviations in alignment between optical components be no higher than a number of microns or smaller (e.g., at sub-micron scale) so that the optical system maintains the appropriate precision and accuracy. Thus, it may be imperative that these (and other) optical systems are properly aligned and are secured to remain that way. In some cases, however, manufacturing deviations (e.g., the optical axes of optical components, the size, shape, etc., of other mechanical components) are enough to exceed desired alignment accuracy.

In some configurations, flexure arrangements with optical components coupled thereto can be reoriented during assembly to align the optical components, including as needed to compensate for manufacturing variabilities (e.g., as noted above). For example, optical components, including lenses, mirrors or other reflectors, projection targets, image sensors, and others, can be aligned by adjusting a flexure arrangement to which the components are coupled to effectively cancel any manufacturing variability and otherwise properly align the optical components.

However, there is room to improve conventional flexure arrangements relative to adjusting and maintaining desired alignment requirements (e.g., sub-micron alignment for high precision optical applications). For example, screws or clamps that couple a flexure to another component in some conventional arrangements can impose a number of problems. For example, screws and clamps may be prone to wear over time, which can allow the optical components to move out of alignment. As another example, particularly for threaded fasteners (e.g., screws), the adjustments made by adjusting the fasteners may not be fine or easily controllable enough to allow the orientation change needed to bring the optical components into proper alignment. Further, the tightening of a clamp or a screw (e.g., for final assembly) can force optical components that have previously been aligned out of proper alignment, which may then require realignment or other corrections, or generally result in the inability to consistently achieve desired alignment.

Some embodiments of the disclosure can address issues with conventional flexure arrangements, including those noted above, by providing improved systems and methods for flexure arrangements for optical components. In particular, some embodiments can provide and maintain proper alignment of optical components long after the optical system is fully assembled (e.g., decreasing shifting of the alignment over time). Similarly, some embodiments can prevent undesirable shifting of the alignment of optical components during and after assembly of an optical system.

In this regard, for example, some embodiments of the disclosure can provide an optical system that includes a receiver secured to a first optical component, and a flexure arrangement secured to a second optical component. The flexure arrangement can include a number of flexures (e.g., flexure arms) each of which is received within a corresponding cavity of the receiver. The cavities and the structure of the flexures can permit adjustments of the orientation of the second optical component relative to the first optical component so as to compensate for slight misalignments (e.g., on the order of micrometers) of the optical components (e.g., prior to assembly, such as manufacturing variations). For example, clearances within the cavities can allow corresponding flexures to be adjusted relative to multiple degrees of freedom while received within the cavities, including so as to adjust the overall system alignment along multiple (e.g., six) degrees of freedom. Once in proper alignment, such as with the second optical component adjusted via adjustment in orientation of the flexures (e.g., by translating the flexures, etc.), the cavities can be filled with an adhesive, which encapsulates a portion (e.g., all) of a circumference of a given flexure (e.g., the circumference defined by a cross-section of the flexure). In this way, once the adhesive has set, the proper alignment of the optical components is maintained and is unlikely to change over time. Further, there may be no risk of disturbing the desired alignment while tightening mechanical fasteners (e.g., screws or clamps) to secure the flexures in place. In some cases, this may be particularly advantageous for high precision optical systems.

FIG. 1 shows a schematic illustration of an optical system 100, according to an embodiment of the disclosure. The optical system 100 includes an optical component 102, a receiver 104, a flexure arrangement 106, and an optical component 108. The optical components 102, 108 can be implemented in various ways, and can generally direct or receive light for a specific purpose. For example, one or both of the optical components 102, 108 can be lenses (or lens assemblies), imaging sensors (e.g., complementary metal-oxide-semiconductor ("CMOS") sensors, charge coupled device ("CCD") sensors, projectors (e.g., digital or analog projectors), optical filters, reflectors (or reflector assemblies), etc.

As shown, the optical component 102 is coupled (e.g., mechanically fastened, secured using adhesives, etc.) to the receiver 104. Similarly, the optical component 108 is coupled to the flexure arrangement 106 (e.g., the same or different ways as the optical component 102). The receiver 104 includes cavities 110, 112 that can be implemented to embody any number of different three-dimensional shapes. including rectangular-prism or otherwise shaped pockets or slots. As used herein "pocket" refers to a cavity that is configured to extend along each side of a relevant (e.g., cross-sectional) perimeter of a flexure or other body received in the cavity. Some pockets may be formed as full pockets, with cross-sectional perimeters configured to fully surround corresponding perimeters of received flexures. Some pockets may be formed as partial pockets, with cross-sectional perimeters configured to extend only partly along one or more sides of a corresponding perimeter of received flexures.

In some cases, the cavities 110, 112 can be defined within respective protrusions that emanate from a surface of the receiver 104. For example, the receiver 104 can have a planar or other body surface, where each protrusion emanates from the planar surface and is substantially perpendicular (i.e., deviates from perpendicular by less than 5 percent) to the receiver surface, although other configurations (e.g., pyramidal protrusions) are possible. Generally, however, the collective orientations of the protrusions should be kinematic in nature, relative to the flexures to be supported. In such a case, for example, the cavities 110, 112 can be directed into the respective protrusion towards the receiver surface with open ends that face away from the receiver surface. In some configurations, the receiver 104 can have a bulk structure with the cavities 110, 112 directed into the bulk structure (e.g., along planar or other body surface, absent protrusions). In some embodiments, an insertion axis of the cavities 110, 112 (i.e., a direction of insertion of a corresponding flexure) may extend in parallel with a particular reference line, such as an optical axis of an optical component to be supported.

In some cases, the cavities 110, 112 can be positioned (and oriented) relative to an axis of the receiver 104 (e.g., a central axis aligned with a relevant optical axis). For example, the cavities 110, 112 can be positioned on opposing sides of the receiver 104 relative to a particular axis. As another example, such as with additional cavities (e.g., three cavities), the cavities can be geometrically oriented relative to the axial axis of the receiver 104 to generally follow various regular shapes (e.g., an equilateral triangle, a regular pentagon, a regular hexagon, etc.). In particular, central locations of each cavity can define a vertex, and each vertex can define the regular (or other) shape.

Although two cavities 110, 112 are shown, fewer or greater numbers of cavities can be utilized. For example, three cavities that collectively define an equilateral (or other) triangle can be used. In some embodiments, the cavities of a receiver may all be substantially similar to each other (e.g., deviating by less than 5% in shape and size). In some embodiments, insertion directions for cavities of a receiver may be substantially parallel (i.e., may deviate from parallel by less than 5%). In some embodiments, other aspects of cavities of a receiver may not be oriented in parallel with each other. For example, elongate directions of a particular slot on a receiver may be oriented obliquely relative to elongate directions of one or more neighboring or other slots on the receiver.

In the illustrated, general example, the flexure arrangement 106 includes flexures 114, 116. The flexures 114, 116 can be structured in different ways. In some cases, the flexures 114, 116 can be planar (i.e., can include substantially parallel opposing sides that are substantially—i.e., 80% or more—wider than a thickness of the flexure perpendicular to the sides), can have no or a variety of different peripheral shapes (e.g., edge or central cut outs), or exhibit other known flexure geometries. In different embodiments, the flexures 114, 116 can be formed out of different materials, including stainless steel, or beryllium copper alloy. In some cases, flexures formed out of a beryllium copper can beneficially provide a relatively high stiffness for the flexures along the longitudinal axis of the flexure. Generally, the flexures 114, 116 can be relatively pliable relative to one or more degrees of freedom (e.g., four degrees of freedom), while being relatively stiff in the other degrees of freedom (e.g., the other two degrees of freedom). The flexures 114, 116 correspond to the cavities 110, 112, respectively, and are configured to be received by and thereby nest within the respective cavities 110, 112. In some cases, such as when there are additional cavities, the flexures 114, 116 can be interchangeably received within any of the cavities as appropriate or a larger number of flexures can be provided. In some embodiments, a particular flexure may be configured to be received only in a particular cavity. Generally, the number of cavities within the receiver 104 is greater than or equal to the number of the flexures of the flexure arrangement 106, so that each flexure can be received within a respective cavity.

Although there are two flexures 114, 116 shown, there can be fewer or greater numbers of flexures within the flexure arrangement 106. For example, in some configurations, the flexure arrangement 106 has three flexures. In some embodiments, the flexures within the flexure arrangement 106 are all substantially similar to each other (e.g., deviating by less than 5% in shape and size). In some embodiments, the flexures 114, 116 and corresponding cavities 110, 112 (or other flexures and cavities) can provide a kinematic arrangement. For example, each flexure of an arrangement can constrain a respective two degrees of freedom of the relative orientation between optical components that are being aligned.

Because the flexure arrangement 106 supports the optical component 108 and the receiver supports the optical component 102, the position of each flexure 114, 116 within each respective cavity 110, 112 can determine the assembled orientation and position of the optical component 102 relative to the optical component 108. Correspondingly, in some embodiments, the cavities 110 can be sized so that the flexures 114 can be adjusted within the cavities 110 relative to one or more (e.g., multiple) degrees of freedom. For example, multiple dimensions of the cavities 110, 112 (e.g., as measured in an associated cross-section) can be larger than corresponding dimensions on the flexures 114, 116 (e.g., as similarly measured). Further, a depth in an insertion direction of the cavities 110, 112 can be larger than a minimum desired insertion length of the flexures 114, 116 (i.e., a minimum length by which the flexures 114, 116 should extend into the cavities 110, 112 for a final assembly). Thus, the flexures 114 116 can be adjusted (e.g., translated) along appropriate degrees of freedom after being nested within the cavities 110, 112 so that the orientation and position of the optical component 108 relative to the optical component 102 can be adjusted and aligned properly (e.g., to compensate for deviations in manufacturing tolerances). In some cases, an aligned orientation of the flexure arrangement 106 can have the flexures 114, 116 (and others) being bent along a moveable degree of freedom of the respective flexure (e.g., bent in a rotational direction that is about a respective bend line).

In different embodiments, different insertion lengths of flexures relative to cavities can be employed. In some cases, to provide appropriate bond area and overall stability, it may be useful to ensure that a flexure extends into a cavity by at least a minimum length. In some cases, a minimum length of one third of a total length of a flexure can be used.

Once the flexures 114, 116 are in the desired position and, correspondingly, the optical components 102, 108 are appropriately aligned, adhesive 118, 120 can be introduced (e.g., injected) into respective cavities 110, 112 and then cured to secure the flexures 114, 116 within the cavities 110, 112. In some cases, prior to curing the adhesive 118, 120, the desired orientation and position of the flexure arrangement 106 can be temporarily fixed, such as by temporarily fixing the position and orientation of each flexure with a UV-cured adhesive. In this way, for example, removal from the adjusting manipulators (e.g., a robotic system that orients the flexures 114, 116), as well as introduction, settling, or curing of the adhesive 118, 120 can be ensured not to change the orientation of the flexure arrangement.

As noted above, once the adhesive 118, 120 has been introduced into the respective cavities 110, 112, the adhesive can be cured to fix the position and orientation of the flexures 114, 116. The curing process can be implemented in different ways, depending on the material composition of the adhesive 118, 120, using a variety of known methods. For example, the adhesive 118, 120 can be implemented as light cured adhesives (e.g., ultraviolet ("UV") curved adhesives), thermal cured adhesives, dual cured adhesives (e.g., thermal and UV cured adhesives), air cured adhesives, humidity cured adhesives, etc.

Depending, for example, how the adhesive 118, 120 are introduced into the respective cavities 110, 112, bonding characteristics of the cured adhesive 118, 120 can vary. For example, the cured bond can extend partially around a perimeter of the flexure (e.g., at a cross-section perpendicular to an insertion direction), or can extend around an entire perimeter of the flexure.

In some embodiments, cavities can be configured with features (e.g., internal profiles) that can help to better align or secure flexures that are received therein. For example, as shown in FIG. 1, an interior of the cavity 110 includes a well 122. In some embodiments, the well 122 can receive the adhesive 118 and thereby help to ensure that an appropriate bond line thickness to secure the flexure 114 within the cavity 110 is obtained. Thus, for example, it may be possible to obtain an appropriately thick bond line regardless of the final position of the flexure 114 within the cavity 110 after adjustment. As another example, a cavity can include an interior recess (e.g., aligned with or separate from a well) within which a flexure can rest once inserted into the cavity.

In some embodiments, the strength of the adhesive, and the total bond area (including the shape of the bond area) can be an important factors that determine the stability of the overall assembly. For example, for a given flexure (e.g., as selected based on the desired stability properties of the optical system), the bond area for the flexure should be sufficient to support the loads of the optical system. In particular, in some cases, an aspect ratio of a bond area should provide a ratio of 1 to 1, or in other words, a substantially square shape (e.g., deviating by less than 5 percent), which can provide an optimal balance of inherent flexure strength and strength of the adhesive bond.

A variety of specific configurations, including for cavity and flexure geometry can be implemented, generally consistent with the principles discussed above. In this regard, for example, FIGS. 2A and 2B show a schematic illustration of an assembly 130 that is a specific example of the optical system 100 and includes a flexure arrangement 132, and a receiver 134. The flexure arrangement 132 includes a flexure 136 (e.g., a planar flexure) that is received within a cavity 138 defined in the receiver 134. A slot 140 is directed along the receiver 134 in a direction defined by the longitudinal extension of the flexure 136 (and, in this case, the insertion direction of the flexure 136 into the cavity 138), which further defines the cavity 138 and provides a partly open side thereof. In the embodiment shown, the slot 140 is smaller in width than the width of the flexure 136, so that the flexure 136 cannot translate through the slot 140 and out of the cavity 138, although other configurations are possible.

Interior walls of the receiver 134 that define the cavity 138 over a longitudinal extent of the flexure 136 extend entirely along both sides that define a thickness of the flexure 136 (i.e., left and right sides in FIG. 2B), extend entirely along a distal surface of a distal end of the flexure 136 (i.e., on a top side in FIG. 2A), extend entirely along one side that defines a width of the flexure 136 (i.e., on a bottom side in FIG. 2B), and extend partially along an opposing side that also defines a width of the flexure 136 (i.e., on a top side in FIG. 2A), as interrupted by the slot 140. Thus, at least part of the cavity 138 provides a partial pocket for the flexure 136. In some configurations, the slot 140 can provide an access location for the insertion of the adhesive within the cavity 138 to secure the position and orientation of the flexure 136 within the cavity 138, although other openings can be used in other configurations.

FIGS. 2C and 2D show a schematic illustration of another assembly 150 that is a specific example of the optical system 100 and includes a flexure arrangement 152, and a receiver 154. The flexure arrangement 152 includes a flexure 156 that is received within a cavity 158 defined in the receiver 154.

Slots 160, 162 are directed along the receiver 154 in a direction defined by the longitudinal extension of the flexure 156 (and, in this case, in the insertion direction of the flexure 156 into the cavity 158), which further defines the cavity 158. In particular, the slots 160, 162 are positioned on opposing sides of the cavity 158, so that the cavity 158 is defined by spaced-apart two portions 164, 166 of the receiver 154. The portions 164, 166 are illustrated as being u-shaped, however other shapes are contemplated. Similarly to the slot 140 of the assembly 130, the slots 160, 162 are smaller in width than the width of the flexure 156.

As shown, interior walls of the first portion 164 of the receiver 154 that partially defines the cavity 158 over a longitudinal extent of the flexure 156 extend entirely along a side of the flexure 156 that defines a thickness of the flexure 156, extend partially along one side of the flexure 156 that defines a width of the flexure, extend partially along an opposing side of the flexure 156 that defines the width of the flexure, and extend partially along a distal surface of the distal end of the flexure 156 (obstructed from view in FIG. 2C) for a longitudinal extent of the flexure 156. Similarly, walls of the second portion 166 of the receiver 154 that partially defines the cavity 158 over a longitudinal extent of the flexure 156 extend entirely along a side of the flexure 156 that defines a thickness of the flexure 156, extend partially along one side of the flexure 156 that defines the width of the flexure, extend partially along an opposing side of the flexure 156 that defines the width of the flexure, and extend partially along a distal surface of the distal end of the flexure 156 (obstructed from view in FIG. 2C) for a longitudinal extent of the flexure 136. Thus, the parts of the cavity 158 defined by the portions 164, 166 individually and collectively provide a partial pocket for the flexure 156. In some configurations, either of the slots 160, 162 can provide an access location for the insertion of the adhesive within the cavity 158 to secure the position and orientation of the flexure 156 within the cavity 158, although other openings can be used in other configurations.

FIGS. 2E and 2F show a schematic illustration of another assembly 170 that is a specific example of the optical system 100 and includes a flexure arrangement 172, and a receiver 174. The flexure arrangement 172 includes a flexure 176 that is received within a cavity 178 defined in the receiver 174. As shown, the cavity 178 of the receiver 174 fully encapsulates both sides that define the width of the flexure 176, both sides that define the thickness of the flexure 176, and a distal surface of a distal end of the flexure 156 (obstructed from view in FIG. 2E) for a longitudinal extent of the flexure 176. Thus, the cavity 178 defines a full pocket for the flexure 176.

In different embodiments, a cavity can be integrally formed with a receiver or can be formed from multiple separate parts. In this regard, for example, the cavity 178 is defined by two portions 180, 182 of the receiver 174 that are coupled to each other (e.g., using fasteners, adhesive, etc.), along the illustrated dashed line of FIG. 2F. In alternative configurations, however, the portions 180, 182 can be integrally formed or more than two portions can be used. Internal to the two portions 180, 182, the cavity 178 is defined by respective recesses 184, 186 in the respective portions 180, 182 of the receiver 174. The recesses 184, 186 are further defined by and include respective wells 188, 190 that are illustrated as angled cuts into walls of the respective portions 180, 182, however the wells 188, 190 can embody other shapes or cuts or may exhibit other dimensions (e.g., widths relative to the recesses 184, 186). In some cases, the width of either or both of the wells 188, 190 can be smaller than a width of the flexure 176. In this way, the flexure 176 cannot be received within the wells 188, 190, and thus adhesive introduced into the cavity 178 can flow into the wells 188, 190 to provide a minimum bond thickness (e.g., minimum bond line) between the receiver 174 and the flexure 176 when the adhesive is cured (e.g., corresponding to a depth of the wells 188, 190).

FIGS. 2G and 2H show a schematic illustration of another assembly 200 that is a specific example of the optical system 100 and includes a flexure arrangement 202, and a receiver 204. The flexure arrangement 202 includes a flexure 206 that is received within a cavity 208 defined in the receiver 204. As shown, for a longitudinal extent of the flexure 206, the cavity 208 of the receiver 204 extends fully along both sides that define a thickness of the flexure 206, and one side that defines a width of the flexure 206. Thus, the cavity 208 provides a slot with at least two open sides to receive the flexure 206. Although, as illustrated, the cavity 208 extends through the entire longitudinal dimension of the receiver 204, in alternative configurations the cavity 208 can extend partially through the longitudinal dimension of the receiver 204. In such a configuration, the cavity 208 can then, for example, encapsulate an entire distal surface of a distal end of the flexure 206. Similarly to the cavity 178, the cavity 208 includes and is further defined by a well 210 that can be implemented in a similar manner as the wells 188, 190 of the receiver 174. As shown, a longitudinal surface of the flexure 206 is exposed to the ambient environment (e.g., prior to introduction of the adhesive. In this way, the cavity 208 provides relatively easy access to receive the adhesive.

In some embodiments, the configurations of FIGS. 2A-2H can be advantageous in that the adhesive can be introduced into the respective cavity in a variety of ways. For example, in some configurations, adhesive can be introduced from the top, along the plane defined by the flexures, etc. In some embodiments, the configurations of FIGS. 2B, 2D, and 2F can be advantageous because the adhesive bond can be loaded in shear (i.e., in the major plane of the relevant cavity) rather than in tension or "peel."

In some embodiments, a cavity arrangement as generally discussed above can be used to secure a flexure to multiple components. For example, a flexure can be secured to a receiver as well as within a larger flexure arrangement by being received and then bonded within corresponding cavities on each of the two or more structures. Correspondingly, although the flexures of FIGS. 2A-2H are not shown as being secured with cavities and adhesive to the respective flexure arrangement, in some configurations these (or other) flexures can be coupled to the corresponding flexure arrangement (or other component) using similar features and components as the previously described cavities and adhesives. Further, it will be understood that the cavities and other features of FIGS. 2A-2H (like others presented herein) are examples only and that certain features of any one of the embodiments (e.g., open sides, slotted or non-slotted features, wells, etc.) can be added to or substituted into any of the other embodiments.

Figure 3:
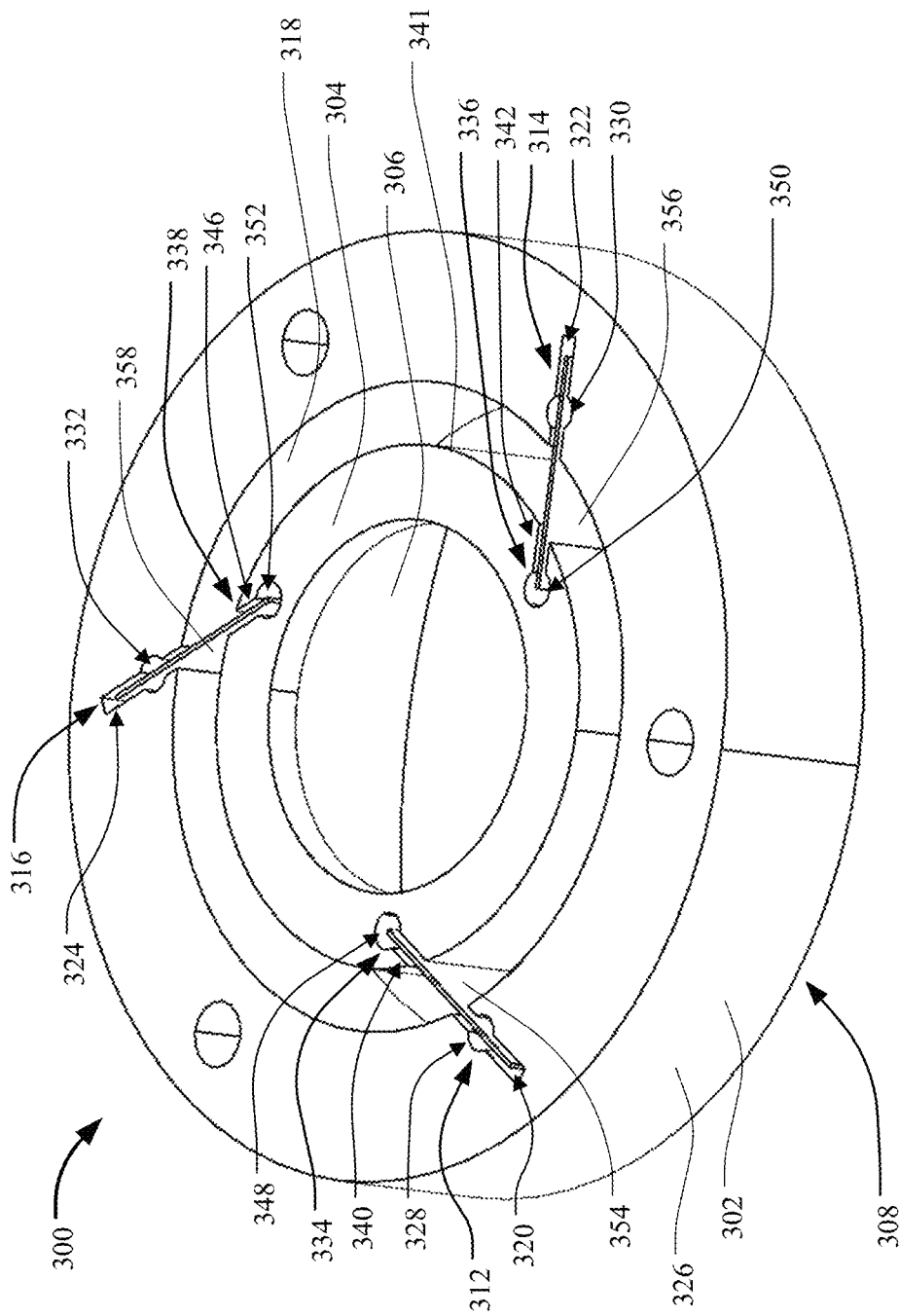
FIG. 3 shows a top isometric view of an optical system.
Figure 4:
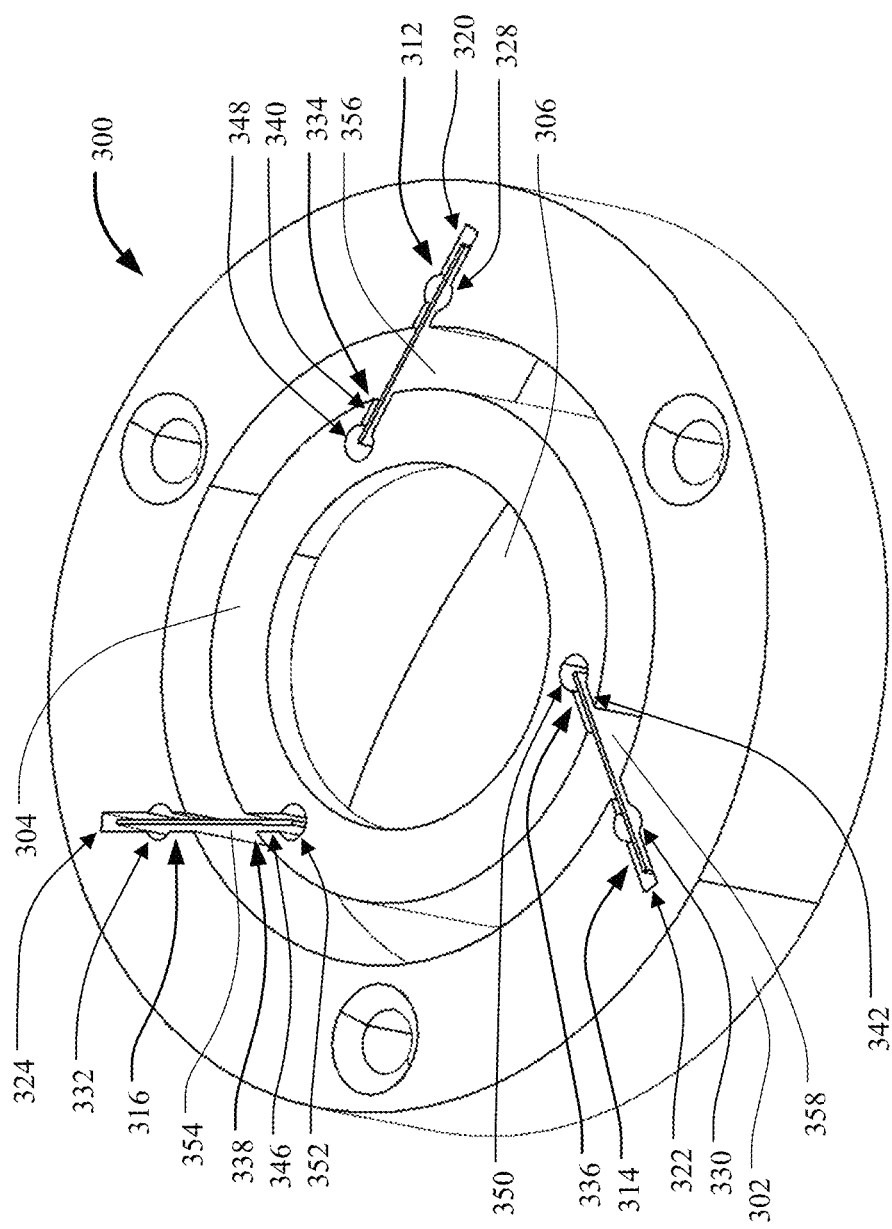
FIG. 4 shows a bottom isometric view of the optical system of FIG. 3.
Figure 5:
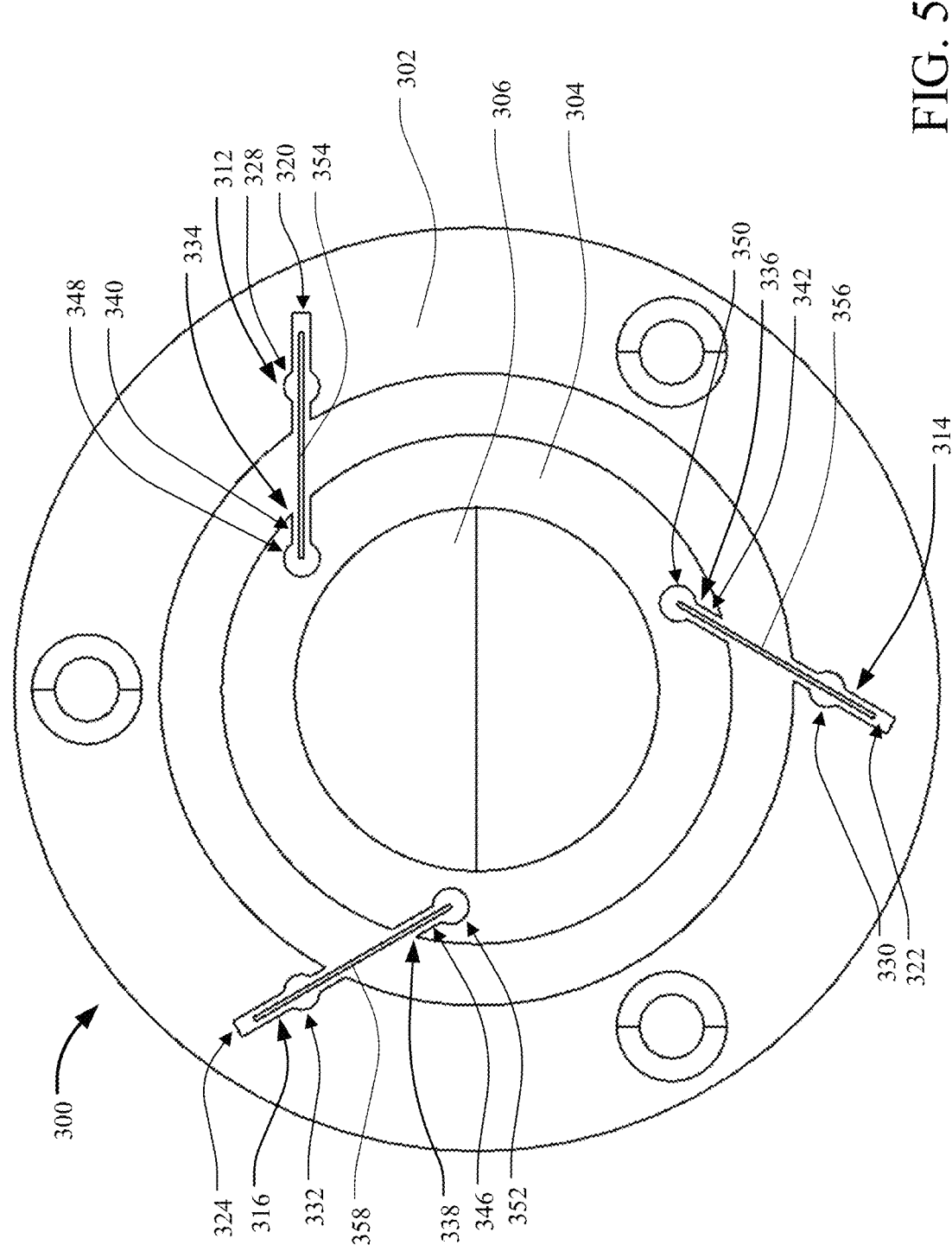
FIG. 5 shows a bottom plan view of the optical system of FIG. 3.

FIGS. 3-5 show an example of an optical system 300 that is a specific example of the optical system 100 according to an embodiment of the disclosure. The optical system 300 includes a first receiver 302, a second receiver 304, an optical component 306, and a flexure arrangement 308. The first receiver 302 is illustrated as being cylindrical in shape, and can be coupled to a second optical component (not shown), including through a secured connection to a frame of an imaging device with an imaging sensor. The first receiver 302 includes cavities 312, 314, 316 that are extend into an interior peripheral surface 318 of the first receiver 302. In particular, each cavity 312, 314, 316 is directed into the peripheral surface 318 of the first receiver 302 at an oblique angle relative to the peripheral surface 318 at the respective cavity 312, 314, 316 or relative to a radial reference line at the same location, although other configurations are possible. Similarly to the optical system 100, the cavities 312, 314, 316 are oriented around to a central axis of the first receiver 302 so that ends of each cavity 312, 314, 316 that define a vertex, where the vertices collectively (relative to the central axis) define a regular shapes. In this case, these vertices of the cavities 312, 314, 316 form an equilateral triangle, although other shapes, including those with more or fewer cavities, are contemplated.

Each of the cavities 312, 314, 316 is primarily formed as a respective slot 320, 322, 324, each of which extends through the peripheral surface 318 in a substantially straight direction and stops prior to advancing through the exterior peripheral surface 326 of the first receiver 302. Each of the cavities 312, 314, 316 also include a respective well, formed as a bore 328, 330, 332 that intersects and extends through the respective slot 320, 322, 324. In particular, each of the bores 328, 330, 332 is positioned between respective ends of the respective slots 320, 322, 324 so that the boundaries defined by each of the bores 328, 330, 332 extend beyond the boundaries defined by the slots 320, 322, 324. Further, the width of each of the bores 328, 330, 332 is greater than the width of the corresponding slots 320, 322, 324 (e.g., relative to the top view of the optical system 300). Correspondingly, each of the bores 328, 330, 332, which are illustrated as cylinders but could be otherwise configured, thus define opposing circular cutouts on opposing sides of the respective slots 320, 322, 324.

Although the cavities 312, 314, 316, the slots 320, 322, 324, and the bores 328, 330, 332 extend entirely axially and fully through the first receiver 302 (e.g., relative to an optical axis of the optical component 306, and a central axis of the optical system 300 generally), in alternative configurations some or all of these can extend in other directions or can extend only partially through the first receiver 302. Correspondingly, in some cases, each (or some) of the cavities 312, 314, 316 can be formed as pockets, access to which may only be possible through the peripheral surface 318 of the first receiver 302.

The second receiver 304 is also illustrated as being circular, and is coaxially positioned relative to the first receiver 302 so that the second receiver 304 is nested within (e.g., concentric with) the first receiver 302, although other shapes or orientations are possible. The optical component 306 is coupled to the second receiver 304 and is also coaxially positioned relative to the second receiver 304. Although the optical component 306 is nested within the second receiver 304, in other configurations, the optical component 306 can be otherwise oriented relative to the second receiver 304. The optical component 306 is illustrated as being a lens, but other optical components can be used as appropriate. The second receiver 304 also includes cavities 334, 336, 338 that are directed into an exterior peripheral surface 341 of the second receiver 304. Similarly to the cavities of the first receiver 302, each cavity 334, 336, 338 is directed into the peripheral surface 341 of the second receiver 302 at an oblique angle relative to the peripheral surface 341 at the respective cavity 334, 336, 338 or relative to a radial reference line at the same location, although other configurations are possible.

Each cavity 334, 336, 338 is primarily formed as a respective slot 340, 342, 346, each of which extends through the peripheral surface 341 in a substantially straight direction and does not extend through the interior peripheral surface of the second receiver 304 (e.g., to intersect the optical component 306). Each cavity 334, 336, 338 also includes a respective well, formed as a bore 348, 350, 352 that extends through the respective slot 340, 342, 346 in a similar manner as the bores 328, 330, 332 of the first receiver 302. However, in contrast to the bores 328, 330, 332, each bore 348, 350, 352 is positioned at the end of a respective slot 340, 342, 346 so that the end of each cavity 334, 336, 338 takes the boundary profile of the respective bore 348, 350, 352 (e.g., rather than the substantially straight slot). The bores 348, 350, 352 are illustrated as being cylindrical, but similarly to the bores 328, 330, 332, the bores 348, 350, 352 can take other shapes. In some embodiments, including as shown, the diameter of the bores 348, 350, 352 are greater than the widths of the respective slots 340, 342, 346.

Although the cavities 334, 336, 338, the slots 340, 342, 346, and the bores 348, 350, 352 extend entirely axially and fully through the second receiver 304 (e.g., relative to an optical axis of the optical component 306, and a central axis of the optical system 300 generally), in alternative configurations some or all of these can extend in other directions or can extend only partially through the second receiver 304. Correspondingly, in some cases, each (or some) of the cavities 334, 336, 338 can be formed as pockets, access to which may only be possible through the peripheral surface 341 of the second receiver 304. Although each end of each of the flexures 354, 356, 358 is described as being received in a corresponding cavity of each receiver, in other configurations, particular ends of one or more of the flexures 354, 356, 358 can be monolithic with the respective receiver. For example, in one configuration, one or more ends of one or more of the flexures 354, 356, 358 that is illustrated as nested within the respective cavities 312, 314, 316 can instead be monolithic (or otherwise fixed, such as with fasteners) with the first receiver 302. As another example, in a second configuration, one or more ends of one or more of the flexures 354, 356, 358 that is illustrated as nested within the respective cavities 334, 336, 338 can instead be monolithic or otherwise fixed, such as with fasteners) with the second receiver 304.

As shown, each of the cavities 334, 336, 338 of the second receiver 304 are in linear alignment with respective cavities 312, 314, 316 of the first receiver 302 in the assembled orientation. In other configurations, the cavities 334, 336, 338 can be otherwise aligned with the respective cavities 312, 314, 316 (e.g., after repositioning and reorientation of either of the receivers 302, 304).

The flexure arrangement 308 includes flexures 354, 356, 358, which are illustrated as being planar and rectangular, although other configurations are possible. The flexures 354, 356, 358 are substantially similar to each other (e.g., having a substantially similar shape and size). Each flexure 354, 356, 358 is positioned within a set of the aligned cavities 312, 334, 314, 336, or 316, 338 in the separate receivers 302, 304. In particular, one end of the flexure 354 is positioned within the cavity 312 and the opposing end of the flexure 354 is positioned within the cavity 334. Similarly, one end of the flexure 356 is positioned within the cavity 314 and the opposing end of the flexure 356 is positioned within the cavity 336. Additionally, one end of the flexure 358 is positioned within the cavity 316 and the opposing end of the flexure 358 is positioned within the cavity 338.

Consistent with the general discussion above, the cavities 312, 314, 316, 334, 336, 338 of the receivers 302, 304 are sized to allow the flexures 354, 356, 358 to be adjusted therein in multiple degrees of freedom. In particular, for the illustrated example, a thickness of each of the cavities 312, 314, 316, 334, 336, 338 is some dimensions of the cavities 312, 314, 316, 334, 336, 338 of the receivers 302, 304 are substantially larger (i.e., 25% or more larger, e.g., 30% or 50% larger) than the corresponding thickness of the flexures 354, 356, 358. For example, a depth of each of the cavities 312, 314, 316, 334, 336, 338 in an insertion direction is larger (e.g., at least 10% larger) than a target (i.e., optimal or intended) insertion length of the corresponding flexures 354, 356, 358. Correspondingly, for example, the length defined between an inner end of one cavity and an inner end of another cavity (e.g., between the blind end of the slot 320 and the opposing side of the bore 348) is substantially larger than the length of the flexure (e.g., the flexure 354). As another example, the thickness of each cavity (e.g., the thickness of the cavities 312, 334) is substantially larger than the thickness of the corresponding flexure (e.g., the flexure 354). As yet another example, the constrained axial height of the cavities is substantially larger (in this case non-existent, due to the axially open-ended configuration) than the axial height of the flexure.

Individually and collectively, these dimensional relationships allow for the flexures 354, 356, 358 to be adjusted within the cavities 312, 314, 316, 334, 336, 338, including, for example, by being translated axially, translated along the length of the flexures (or cavities), translated along the width of the cavities, deflected (or rotated) about the axial axis, pivoted about the axis defined by the length of the flexures, or pivoted into or out of the page with respect to the top or bottom view. Thus, each of these flexures 354, 356, 358 can be adjusted relative to multiple degrees of freedom and alignment of the assembly as a whole can be adjusted, at least somewhat, along multiple degrees of freedom (e.g., six degrees of freedom). As such, the alignment of the receivers 302, 304 can be adjusted via the flexures 354, 356, 358 to compensate for manufacturing deviations. Thus, the optical component 306 and an optical component that can be coupled to the first receiver 302 can be properly aligned.

Once the receivers 302, 304 have been aligned as desired, the orientation and the position of the flexures 354, 356, 358 can be fixed with adhesive that is introduced into the cavities 312, 314, 316, 334, 336, 338. In some cases, as generally discussed above, the flexures 354, 356, 358 can first be temporarily fixed (e.g., with light-cured adhesive And then adhesive can be cured within each of the cavities 312, 314, 316, 334, 336, 338 to maintain the desired aligned position of the receivers 302, 304 (and associated optical components).

FIGS. 6-13 show an example of an optical system 400 that is a specific example of the optical system 100 according to an embodiment of the disclosure. The optical system 400 includes a first optical assembly 402, a flexure arrangement 404, a second optical assembly 406, and a receiver 408. The first optical assembly 402 includes a housing 409 and a first optical component 411, which is implemented in the illustrated embodiment as a lens (although other optical components could be utilized or substituted). The first optical assembly 402 (and the first optical component 411) is coupled to the receiver 408 using one or more fasteners (not shown) that can threadingly engage the first optical assembly 402 and the receiver 408. In other cases, the optical assembly 402 can be coupled to the receiver 408 in other ways (e.g., via ultrasonic welding, adhesives, etc.), or the optical assembly 402 and the receiver 408 can be integrally formed.

The flexure arrangement 404 is formed as an extension of the second optical assembly 406 and includes flexures 410, 412, 414, a plate 416, and fasteners 420, 422 (and one or more others, not shown). The flexures 410, 412, 414 are substantially similar to each other (e.g., substantially similar in shape and size), are planar, and extend substantially perpendicularly from the plate 416. Similarly to the configurations discussed above, a central location of each flexure 410, 412, 414 defines a vertex, such that when viewed from a top view, the connected vertices define an equilateral triangle (e.g., each of the flexures 410, 412, 414 is offset sixty degrees relative to adjacent flexures), although other configurations are also possible. The fasteners 420, 422 (and corresponding holes that receive the respective fasteners) are positioned behind the respective flexures 410, 412, 414 and threadingly engage a support block 424 of the second optical assembly 406 to couple the flexure arrangement to the second optical assembly 406.

The second optical assembly 406 includes the support block 424, a printed circuit board 426, and a second optical component 428. The second optical component 428 is implemented as an image sensor that is affixed and integrated with the printed circuit board 426, although other optical components could be utilized and substituted accordingly. The support block 424 is illustrated as having a substantially J-shape, with the plate 416 of the flexure arrangement 404 coupled to an angled surface of the support block 424, although a variety of shapes are contemplated including rectangular blocks and other support structures.

Figure 6:
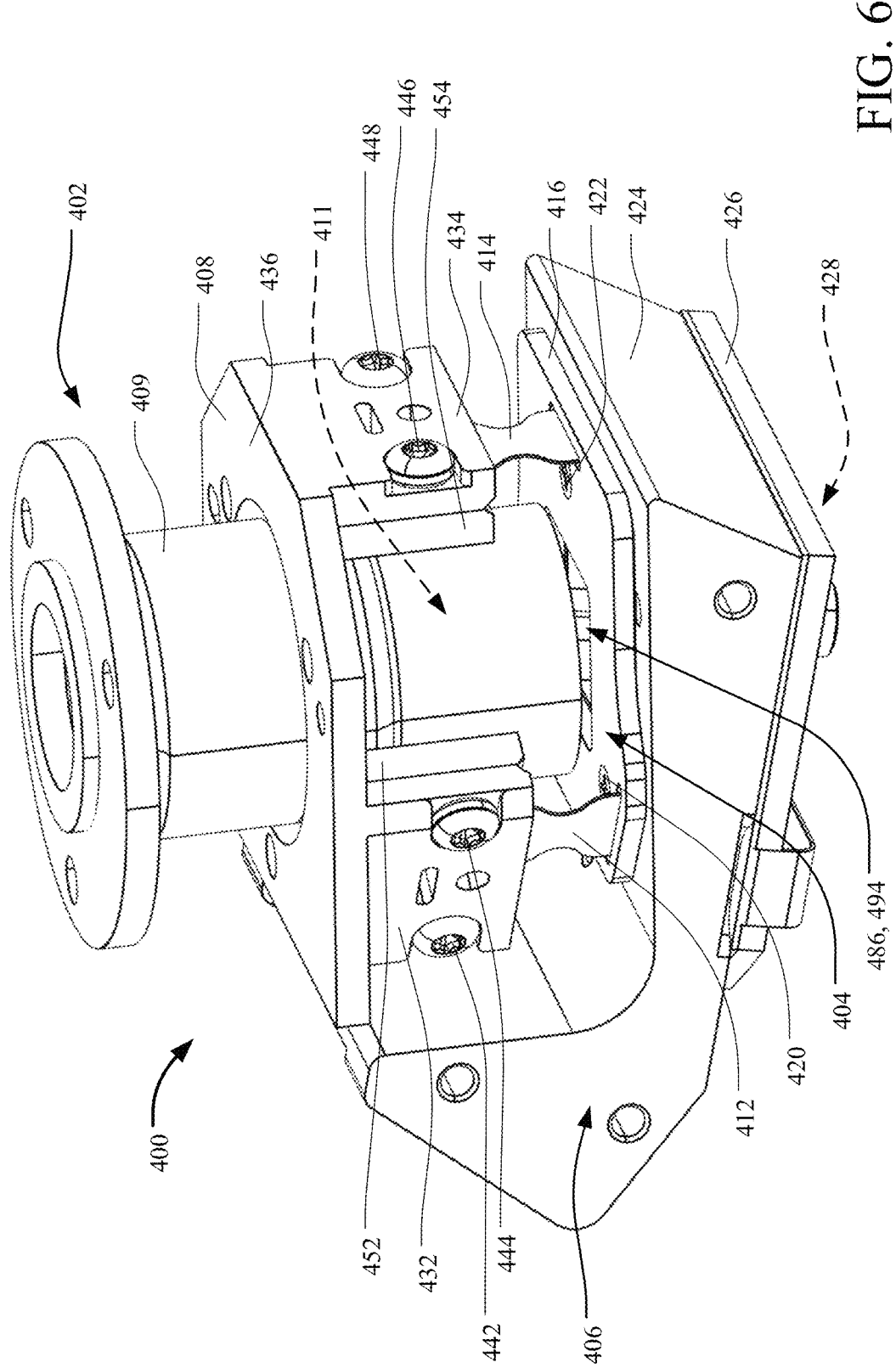
FIG. 6 shows a front isometric view of an optical system.
Figure 7:
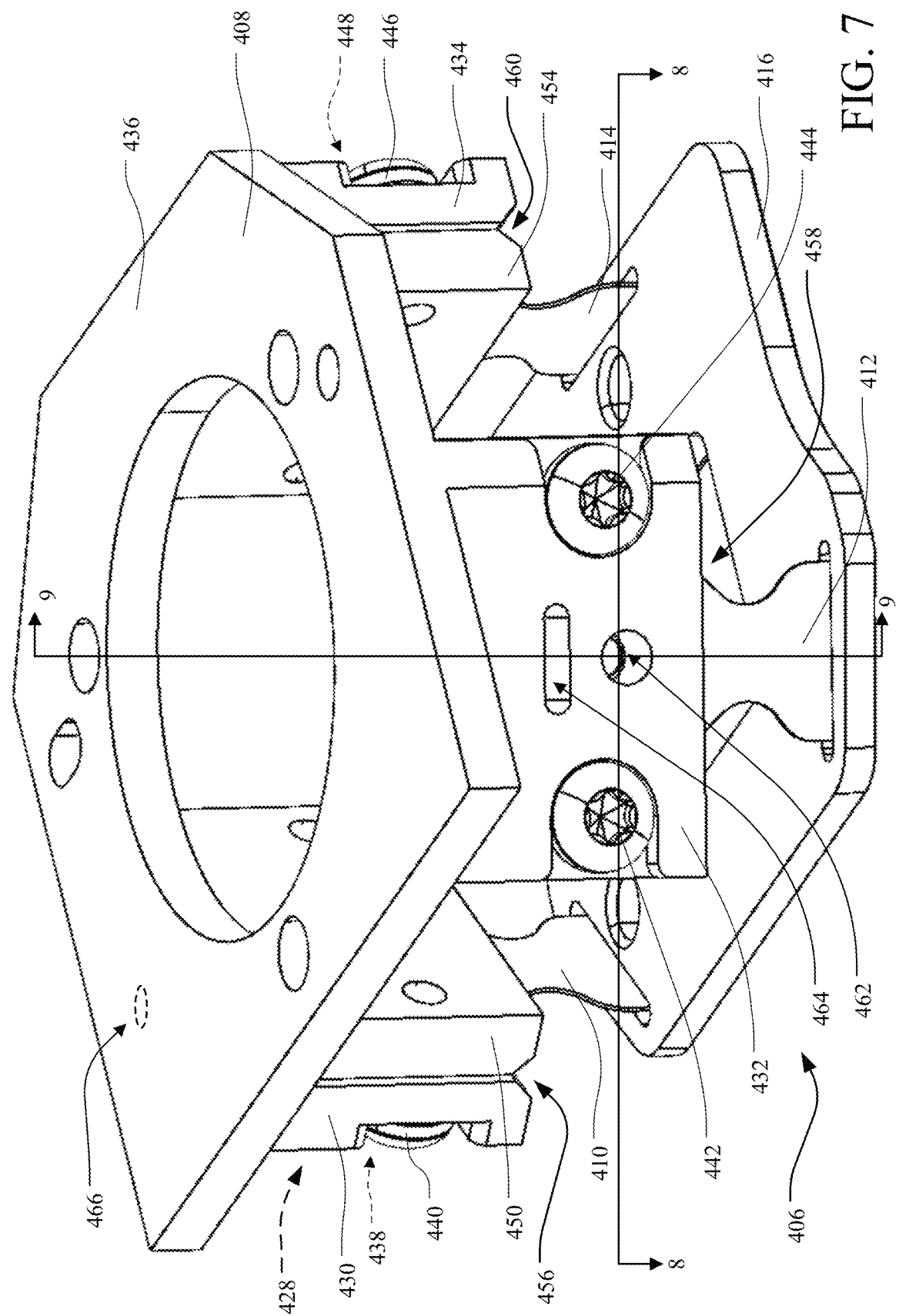
FIG. 7 shows a front isometric view of a flexure arrangement and a receiver of the optical system of FIG. 6.

As shown in FIGS. 6 and 7 in particular, the receiver 408 includes protrusions configured as pocket blocks 430, 432, 434 (including block caps 450, 452, 454) extending substantially perpendicularly from a receiver body 436, with fasteners 438, 440, 442, 444, 446, 448 that secure the block caps 450, 452, 454 in place. In particular, the fasteners 438, 440 threadingly engage the pocket block 430 and the block cap 450 to couple these components together. Similarly, the fasteners 442, 444 threadingly engage the pocket block 432 and the block cap 452 to couple these components together. Additionally, the fasteners 446, 448 threadingly engage the pocket block 434 and the block cap 454 to couple these components together.

Each pocket block 430, 432, 434, including the corresponding block cap 450, 452, 454 defines a corresponding pocket, which will be described in more detail below. In some cases, rather than being formed from multiple pieces, a pocket block or other protrusion can be integrally formed with the receiver body 436. Further, although base portions of the pocket blocks 430, 432, 434, to which the block caps 450, 452, 454 are secured, are shown as being integrally formed with the receiver body 436, in other configurations, pocket blocks can be formed entirely separately from a receiver body and then coupled thereto.

As shown in particular in the assembled configuration of FIG. 6, a free end of each flexure 410, 412, 414 (e.g., the end of each flexure opposite the plate 416) is received within a respective pocket defined by each pair of a pocket block and a block cap. In particular, the pocket block 430 defines a pocket 456, the pocket block 432 defines a pocket 458, and the pocket block 434 and the block cap 454 defines a pocket 460. Although a variety of pocket or other cavity configurations are possible (e.g., as discussed above), the geometry of each pocket 456, 458, 460 is at least partially determined internal recesses of the respective blocks that define the particular pocket, which will be described in more detail below. In the assembled configuration, the free end of the flexure 410 is received within the pocket 456, the free end of the flexure 412 is received within the pocket 458, and the free end of the flexure 414 is received within the pocket 460.

To assist with introduction of adhesive during assembly, each pocket block 430, 432, 434 includes multiple openings formed as an injection port and a viewing port, respectively, in fluid communication with the respective pocket 456, 458, 460. In other cases, one or both of an injection port or a viewing port can be directed through another surface (e.g., upper surface of the receiver body 436, or otherwise). In the illustrated example, as shown in FIG. 7 in particular, an injection port 462 and a viewing port 464 are both directed into the surface of the pocket block 432 opposite the block cap 452 (see FIG. 6), and both in fluid communication with the pocket 458. In some embodiments, the injection port 462 can receive an adhesive dispenser (not shown), such as a needle, a syringe, etc., to introduce the adhesive into the pocket 458 via the injection port 462. The viewing port 464 can, after the adhesive has been introduced into the pocket 458, be used to ensure (e.g., via visual inspection by a user) that the adhesive has dispersed or cured properly. For example, adhesive can be introduced into the pocket 458 until the adhesive oozes out of (or is visible within) the viewing port 464. This can provide a clear visual indication (e.g., to a user) that enough adhesive has been dispensed to fill the entire pocket 458 with adhesive. In some cases, without this visual identification, a respective pocket can be easily under-loaded with adhesive, which can provide an undesirable adhesive bond. In some embodiments, additional or alternative injection ports can be alternatively oriented (e.g., as shown for an opening 466 in FIG. 7). In some embodiments, an open end of a cavity, including an open end through which a flexure is received, can provide an opening for introduction or visual inspection of adhesive.

Figure 8:
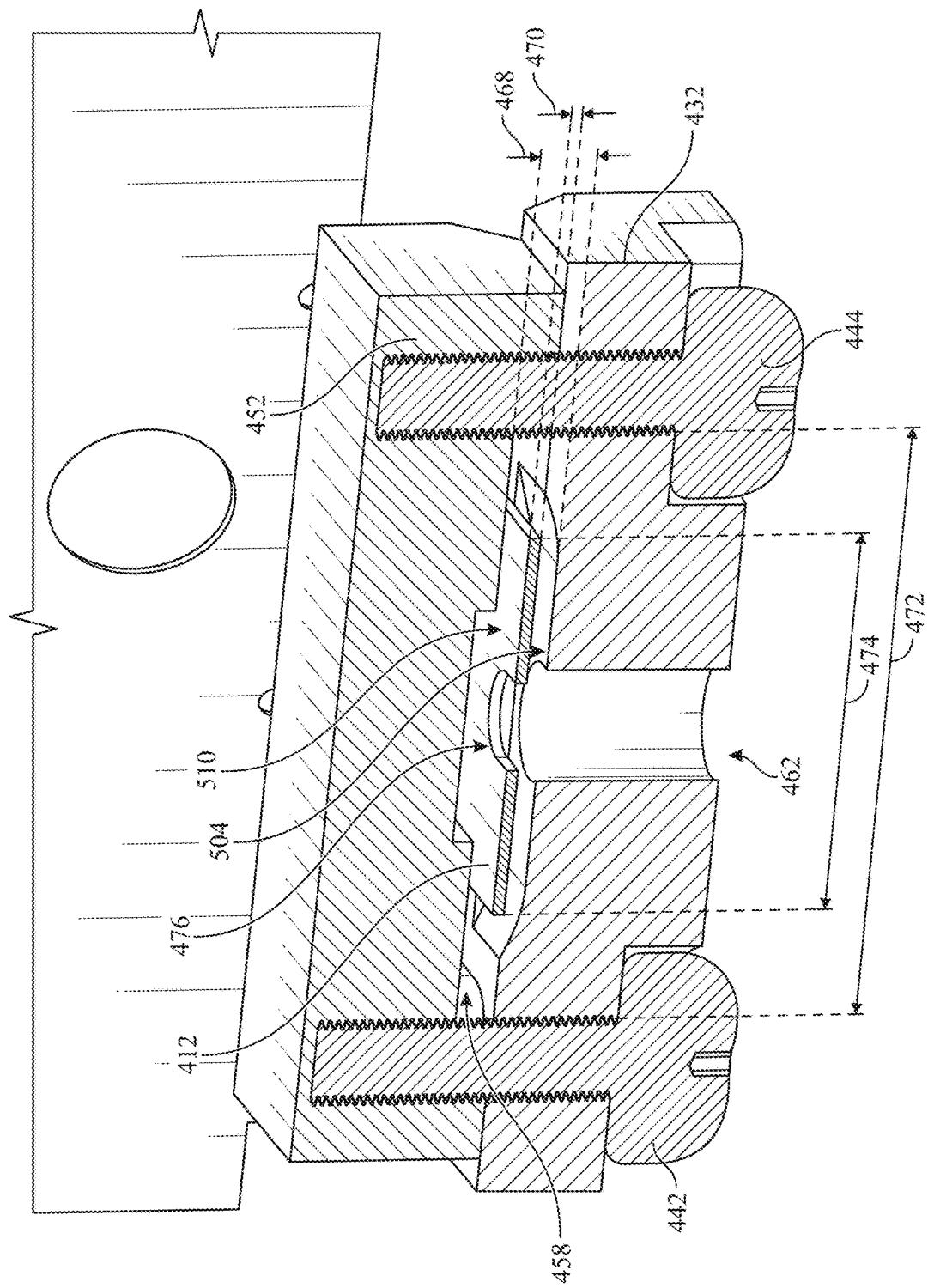
FIG. 8 shows a cross-sectional view of a pocket of the receiver of FIG. 7, with a flexure therein, taken along line 8-8 of FIG. 7.

FIG. 8 shows a cross-sectional view of the pocket 458 with the flexure 412 therein taken along line 8-8 of FIG. 7. As shown, the dimensions of the flexure 412 are substantially smaller than the dimensions of the pocket 458, which allows the flexure 412 to be adjusted relative to multiple degrees of freedom (e.g., translated and rotated) to align the optical assemblies 402, 406 (see FIG. 6). For example, a thickness 468 of the pocket 458 perpendicular to an insertion direction is substantially larger (e.g., at least 50% larger) than a thickness 470 of the flexure 412. As another example, a width 472 of the pocket 458 is substantially larger than a width 474 of the flexure 412.

FIG. 8 also shows the spatial relationship between the injection port 462 and an opening 476 directed through the flexure 412 proximate the free end thereof. As shown, the injection port 462 is in alignment with the opening 476. Accordingly, when adhesive is injected into the pocket 458 via the injection port 462, the adhesive can readily flow through the opening 476 to disperse on the opposing side of the flexure 412 (e.g., the side of the flexure 412 that does not face the injection port 462.

Figure 9:
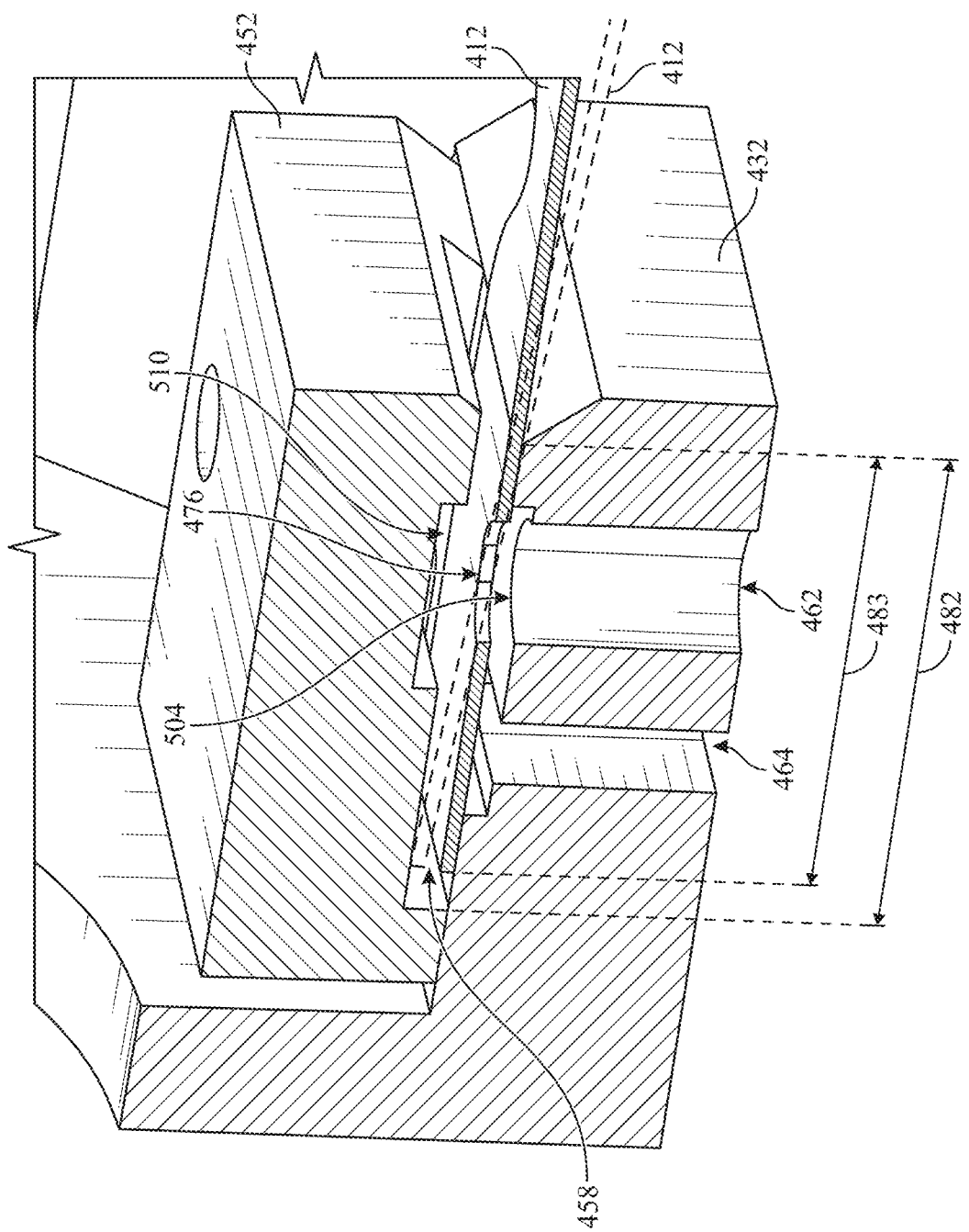
FIG. 9 shows another cross-sectional view of the pocket with the flexure therein of the arrangement of FIG. 7, taken along line 9-9 of FIG. 7.

FIG. 9 shows another cross-sectional view of the pocket 458 with the flexure 412 therein, taken along line 9-9 of FIG. 7. As shown, the length 482 of the pocket 458 in the insertion direction is sized to be substantially larger (e.g., at least 25% larger) than an insertion depth 483 for the flexure 412, so that the flexure 412 can be translated relative to a degree of freedom corresponding to a direction that is defined by the length 482 of the pocket 458. This further supports a high degree of adjustability of the flexure 412 (and other similar flexures) while also helping to ensure that the flexure 412 can remain sufficiently inserted into the pocket 458 to provide appropriate bond area for the adhesive.

FIG. 9 also shows, in an alternative configuration indicated by a dotted-line outline, the flexure 412 being bent with the free end of the flexure 412 contacting an inner surface of the block cap 452. In particular, the flexure 412 is shown as having been bent or pivoted about the bend at the opposing end of the flexure 412 (e.g., the end in close proximity to the plate 416), although a variety of other deformations are also possible. This bending of the flexure 412 can also correspondingly cause the other flexures 410, 414 to bend to accommodate the movement of the flexure 412. Thus, in an aligned (i.e., adjusted) position of the flexure arrangement 404, each flexure 410, 412, 414 can sometimes be bent to various degrees relative to a starting configuration (e.g., at a bent joint with a support plate). Generally, due y to the relatively large size of the pockets 456, 458, 460, even with one or more of the flexures 410, 412, 414 in a bent configuration, the amount of adhesive on opposing longitudinal surfaces of each flexure may be substantially the same (e.g., deviating by less than 5 percent). In this way, as further enhanced in some cases by the inclusion of an adhesive well (as also discussed below), the flexures 410, 412, 414, even in a bent configuration, can be reliably and securely anchored in place once the adhesive has cured.

Figure 10:
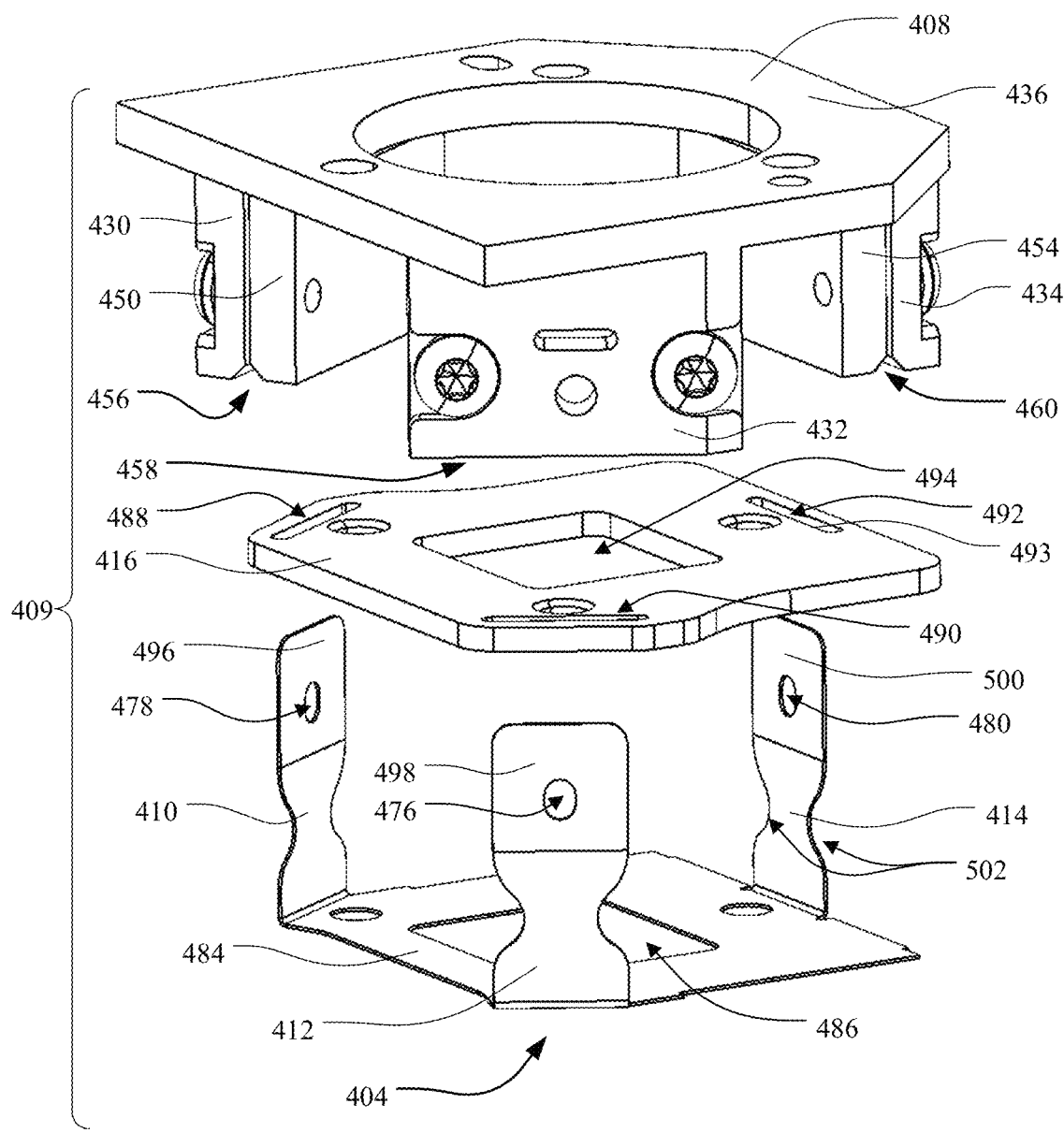
FIG. 10 shows an exploded view of the assembly of FIG. 7 defined by the flexure arrangement and the receiver.
Figure 11:
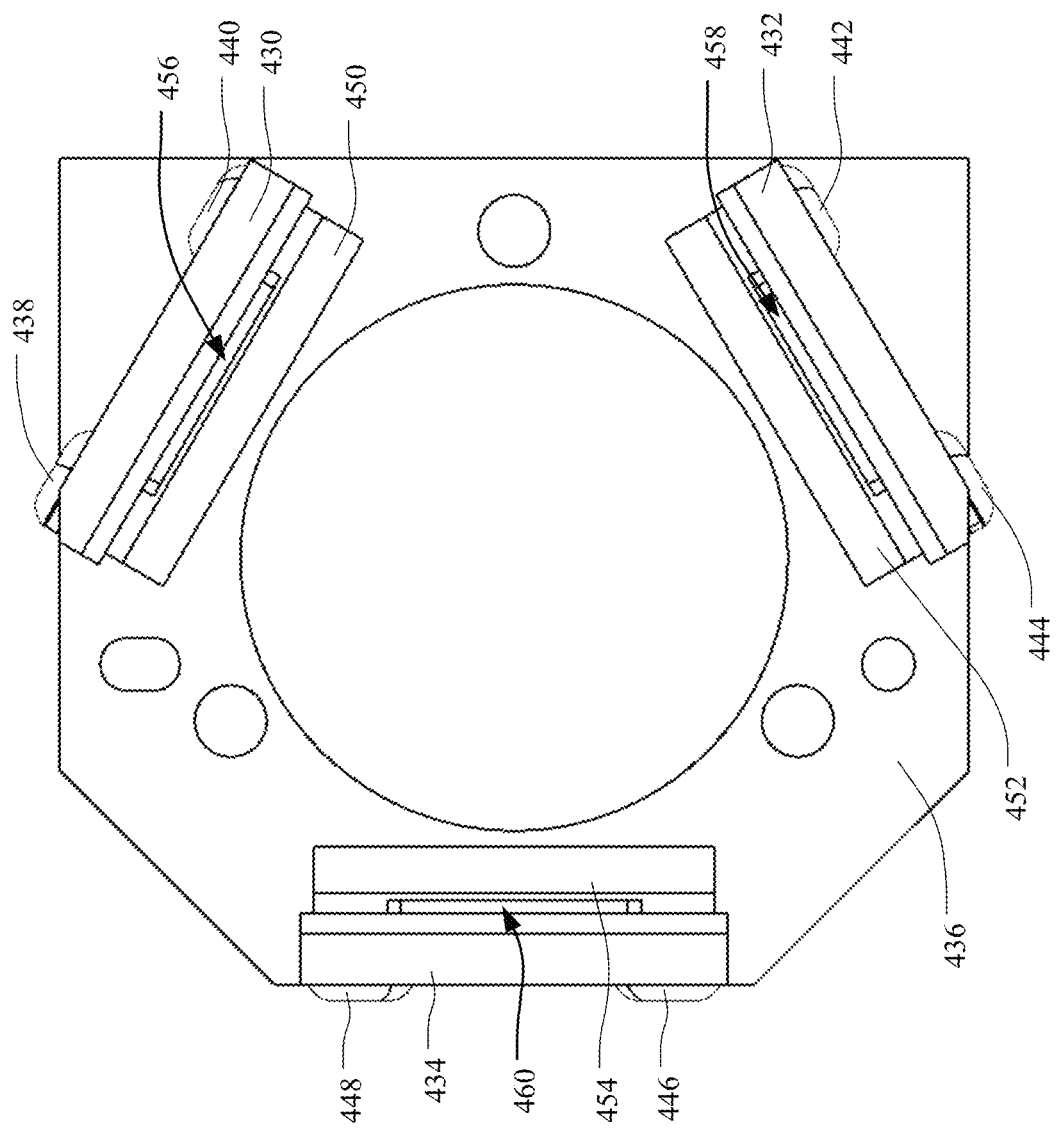
FIG. 11 is a bottom plan view of the receiver of the optical system of FIG. 6.

In different embodiments, as generally discussed above, flexures of a flexure arrangement can be configured in various ways for attachment to an optical component. In this regard, for example, FIG. 10 shows an exploded partial view of a sub-assembly 409 of the optical system 400, including the flexure arrangement 404 and the receiver 408. In the embodiment shown, the flexure arrangement 404 further includes a flexure body 484 that is integrally formed with the flexures 410, 412, 414 and includes an aperture 486 that is centrally located on the body 484. The plate 416 also includes elongated slots 488, 490, 492 that are axially directed through the entirety of the thickness of the plate 416, and an aperture 494 that is also centrally located. Each of the flexures 410, 412, 414 include respective free ends 496, 498, 500 opposite the flexure body 484, each having an opening 478, 476, 480 directed therethrough. As described above, the flexures 410, 412, 414 are planar, and each has a neck region of reduced width that can allow for better flexibility (e.g., a neck region 502 of the flexure 414).

The illustrated sub-assembly 409 of FIG. 10 can be assembled by inserting the free end 496 of the flexure 410 through the slot 488, inserting the free end 498 of the flexure 412 through the slot 490, and inserting the free end 500 of the flexure 414 through the slot 492. Once the flexures are inserted into the respective slots of the plate 416, e.g., with the flexure body 484 abutting the plate 416 so that the aperture 486 is aligned with the aperture 494, the plate 416 and the flexure body 484 can be coupled together (and to other components), with fasteners or other features. In the illustrated embodiment, as shown in FIG. 6, for example, the apertures 486, 494 are aligned with an aperture of the support block 424 of the optical assembly 406 so that light from the optical assembly 406 can be received at the second optical component 428.

In some embodiments, the plate 416 provides a connection that stiffly secures the flexures 410, 412, 414 to the component that supports the second optical component 428 (e.g., in a clamp-like manner). For example, when the plate 416 secures the flexure body 484 to the optical component 428, when assembled, the bent ends of each flexure 410, 412, 414 are secured in close proximity to edges of the respective slots 488, 490, 492 of the plate 416. Further, each of the flexures 410, 412, 414 have a rather small bend radius at the bend near the slots 488, 490, 492, and each inner edge of each slot 488, 490, 492 in the plate 416 is placed as close as possible to each bend radius of each corresponding flexure. Accordingly, the flexure arrangement 404 as a whole may be prevented from bending to allow the flexures 410, 412, 414 to extend longitudinally (e.g., along the longitudinal extent of the particular flexure). In some embodiments, each internal edge of each slot 488, 490, 492 can be substantially parallel to each corresponding flexure 410, 412, 414.

Although the slots 488, 490, 492 are illustrated as being closed (e.g., bounded by two sides) in other configurations the outer edge of each slot 488, 490, 492 can be removed, or in other words, each slot 488, 490, 492 can be an open-sided slot. For example, the inner edge 493 of the slot 492 is positioned in close proximity to the bend of the flexure 414 and can be the only edge of the slot 492. In other configurations, other components can be substituted for the plate 416, but can provide a similar structure and function as the plate 416. For example, a washer (e.g., a round or other washer) can be similarly interfaced with each flexure.

With the flexure arrangement 404 thus prepared, each of the flexures 410, 412, 414 can then be received within the respective pockets 456, 458, 460 as shown in FIG. 7. For example, the free end 496 of the flexure 410 is inserted into the pocket 456, the free end 498 of the flexure 412 is inserted into the pocket 458, and the free end 500 of the flexure 414 is inserted into the pocket 460.

The position and orientation of the flexures 410, 412, 414 can be adjusted within the respective pockets 456, 458, 460 as described above (e.g., to compensate for manufacturing variability and to compensate for deviations in optical component alignment). Then, adhesive can be inserted into each of the pockets (e.g., via a respective injection port) to fix the desired orientation and position of the flexures 410, 412, 414 (e.g., once the adhesive has cured). Notably, in this embodiment, similarly to other embodiments discussed above, each of the flexures 410, 412, 414 are directly coupled to the receiver 408 using only the adhesive received within the pockets 456, 458, 460 and no other mechanical fastening elements. For example, the flexures 410, 412, 414 are not directly fastened to the receiver 408 using bolts, screws, clamps, etc. Correspondingly, for example, as also discussed above, the act of securing the flexures 410, 412, 414 in the desired alignment may not introduce stresses that adversely affect the alignment, as can occur, for example, with screws or clamps.

As also noted above, in some cases, the insertion depth of a flexure within a given pocket can be at least a third of the length of the given flexure (e.g., as measured for the flexure overall or from an opposing anchor point of the flexure). In this way, an appropriate strong mechanical interface is achieved. Additionally, in some cases, each of the flexures can have a ratio of bond area (e.g., the total area defined between the adhesive, a surface of the flexure, and a surface of the walls that define the pocket) to insertion depth for a flexure that is greater than a threshold ratio.

Figure 12:
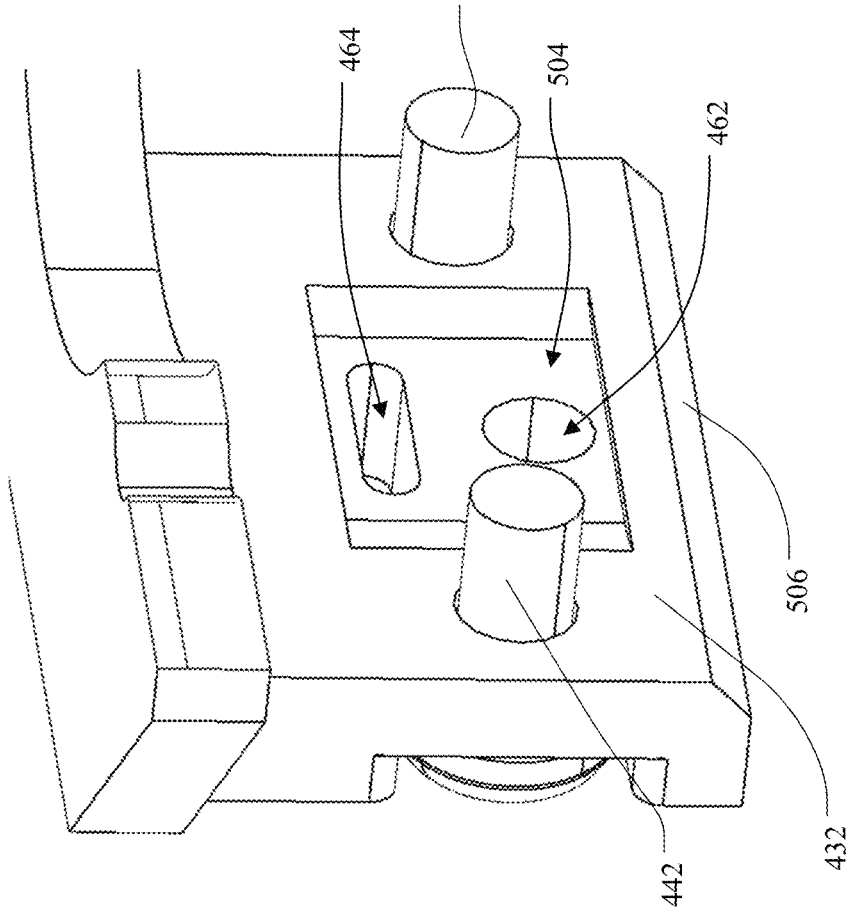
FIG. 12 is a front isometric view of the interior space of the pocket block of the receiver of FIG. 6.

As also noted above, certain features can be provided to ensure appropriate bond line thickness or other beneficial results. In this regard, for example, FIG. 12 shows the interior space of the integrally formed portion of the pocket block 432, which is similar to the corresponding interior space of the other pocket blocks 430, 434. In particular, the pocket block 432 includes a relatively flat surface that abuts against a surface of the block cap 452 when assembled, and a well 504. The well 504 is in fluid communication with both the injection port 462 and the viewing port 464. During assembly and thereafter, the well 504 provides a local maxima depth region for the pocket 458 that can increase the thickness of the bond between the pocket block 432 and the flexure 412 by defining a minimum possible bond line thickness (and, in some cases, also a maximum bond line thickness). In the illustrated example, the pocket block 432 also includes a chamfer 506 that is angled toward the pocket 458, such as may assist in initial insertion of a flexure.

Figure 13:
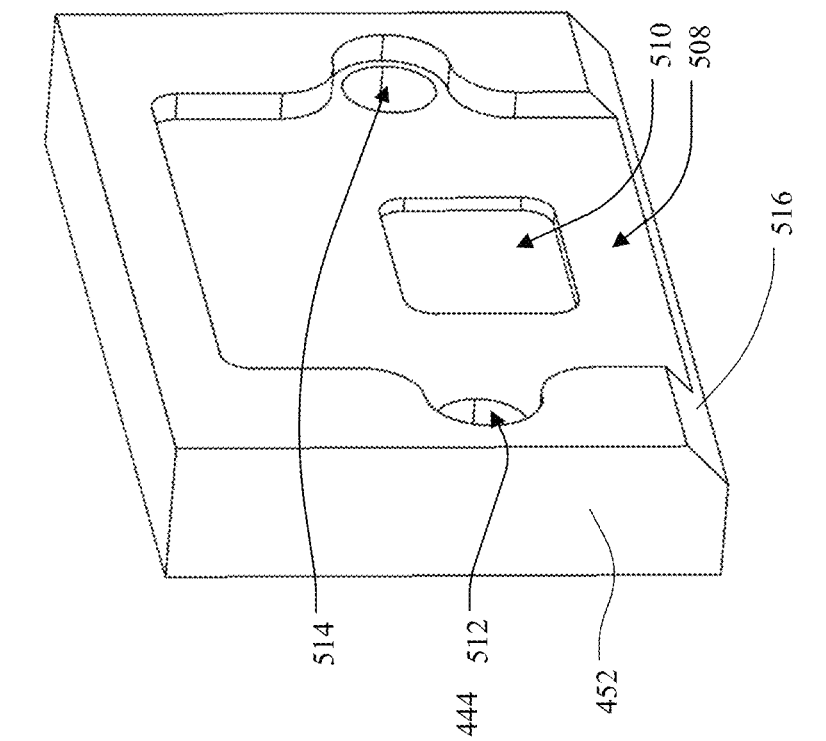
FIG. 13 is a front isometric view of the interior space of the block cap of the receiver of FIG. 6.

Continuing, FIG. 13 shows the interior space of the block cap 452, which is similar to the interior space of the other block caps 450, 454. In particular, the block cap 452 includes a recess 508, a well 510 within the recess 508, and bores 512, 514, and a chamfer 516 that is angled toward the pocket 458 and faces the chamfer 506. The recess 508 further defines the boundaries of the pocket 458 and is configured to receive a flexure nested therein. The well 510, which has a width that is smaller than a width of the flexure 412, is directed into the rear surface that defines the recess 508. Similarly to the well 504, the well 510 advantageously provides a minimum bond thickness for adhesive introduced into the pocket 458 to secure the flexure 412. In particular, because the flexure 412 is too wide to be received within the well 510 the well 510 can be filled with adhesive regardless of the position of the flexure 412 (e.g., particularly as fed via the aligned opening 476 and injection port 462, as shown in FIG. 9). Accordingly, even when the flexure 412 is abutted against the interior surface of the block cap 452 adjacent the well 510, adhesive within the well 510 can provide a minimum bond thickness defined by the depth of the well 510.

In some embodiments, as generally noted above, a well can be aligned with other openings to more easily receive adhesive during assembly. For example, referring again to FIG. 8, it can be seen that the injection port 462, the opening 476, and the well 510 are aligned along an injection axis defined by the injection port 462. Accordingly, adhesive can easily flow from the injection port 462, through the opening 476, and into the well 510, as well as to other parts of the pocket 458. Thus, for example, even if the flexure 412 is adjusted to be flush against certain internal surfaces of the pocket 458, a reliable flow of adhesive to satisfactorily fill the pocket 458 (including the well 510) can be readily achieved.

In some of the embodiments above, including relative to the systems 300, 400 adhesive is discussed but not expressly shown in the corresponding figures to provide clearer views of other components in the figures. Those of skill with the art will recognize that liquid adhesive, for example, before hardening, may fully or partially fill the spaces into which the adhesive is introduced (e.g., within the various cavities of the systems 300, 400) depending on a variety of properties, including viscosity, surface tension, surface compatibility, and so on, including as schematically illustrated in FIGS. 2B, 2D, 2F, and 2H.

Figure 14:
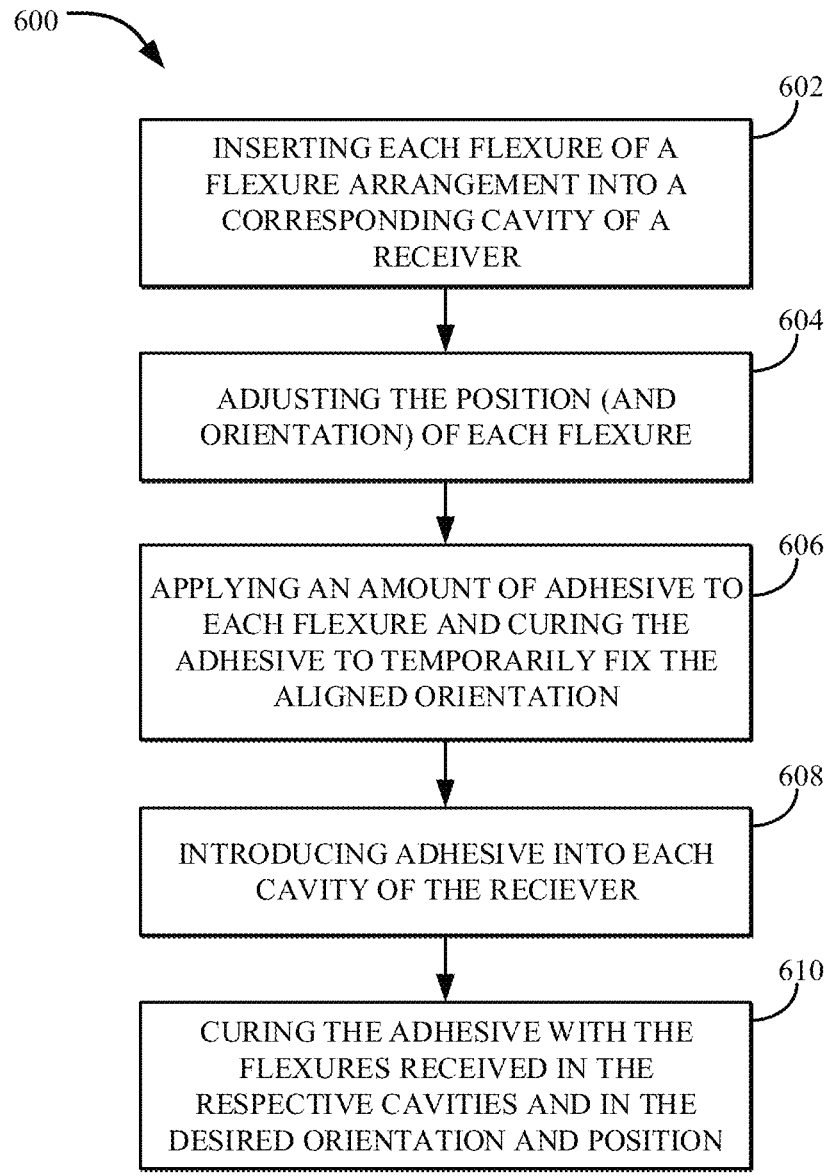
FIG. 14 shows a flowchart of a process for assembling an optical system.

Consistent with the discussion above, some embodiments can include methods of aligning optical components, including within the various optical assemblies expressly discussed above. In this regard, for example, FIG. 14 shows a flowchart of a process 600 for assembling an optical system. At operation 602, the process 600 can include inserting one or more flexures (e.g., each flexure) of a flexure arrangement into a corresponding cavity of a receiver. In some cases, one end of each flexure can be inserted into a cavity of one receiver and the opposite end of each flexure can be inserted into another cavity of a second receiver (e.g., as forms part of a flexure assembly to be secured to the first receiver).

At operation 604, the process 600 can include adjusting the position and orientation of each flexure, when the flexures are received within the respective cavities. By adjusting the position and orientation of the flexure arrangement, the desired alignment between optical components coupled to the receiver and the flexure arrangement, respectively can be realized. In some embodiments, as also discussed above, adjusting flexures can include adjusting flexures relative to multiple degrees of freedom within the corresponding cavities, including so as to adjust a larger optical system relative to multiple (e.g., six) degrees of freedom. In some cases, some or all of the flexures within the flexure arrangement can be bent (e.g., pivoted) relative to a base structure, which can sometimes result in each flexure contacting only one longitudinal surface of the respective cavity. In some embodiments, a robotic or other automated system can be used to appropriately align the relevant components. For example, a manipulator (e.g., of a robot arm) can hold and orient the flexure arrangement to move the arrangement to a properly aligned orientation.

At operation 606, the process 600 can include temporarily fixing the desired position of each flexure of the flexure arrangement. For example, a droplet or bead of light cure adhesive can be placed on an external surface of the flexure (e.g., along a chamfer at an entrance to a pocket or other cavity, as may provide enhanced surface area), and the light-cured appropriately to temporarily fix the desired position of each flexure. In some embodiments, such temporary fixing of a flexure may not be performed or may not be performed for all flexures. In different embodiments, temporarily fixing a flexure may be performed before or after introducing a main charge of adhesive for permanent fixing of the flexure(s). In some embodiments, temporarily fixing the desired position of each flexure can occur with a manipulator holding the flexure arrangement in the desired orientation.

At operation 608, the process 600 can include introducing adhesive into each cavity of the receiver that is associated with a flexure, with the flexures received within the respective cavities. In some cases, the adhesive can be introduced into each cavity via an injection port or other opening that is separate from an insertion opening through which the flexure is introduced into the cavity. Additionally, in some cases, adhesive can be introduced into the cavity (e.g., via an injection port) until adhesive oozes out of (or is visible within) a viewing port that is in fluid communication with the cavity. In different embodiments, as alluded to above, adhesive can be introduced into a cavity at operation 608 before or after a flexure is temporarily fixed in place, as applicable.

At operation 610, process 600 can include curing the adhesive with the flexures received in the respective cavities and in the desired orientation and position (e.g., the collective aligned orientation). Any variety of known methods for known adhesives can be used at operation 610 to secure the flexures in the appropriate alignment. In some embodiments, adhesive can be cured after the assembly has been removed from an alignment system (e.g., a robotic system), such as after a temporary fixing of the flexures under operation 606 has been completed. Thus, for example, the alignment system can be used for other assemblies even as the main charge of adhesive cures, thereby generally improving manufacturing throughput.

In some embodiments, process 600 can include removing a flexure arrangement from a manipulator (e.g., of a robotic system) after adhesive is applied. For example, after the desired orientation is temporarily fixed (e.g., as discussed above), the flexure arrangement can be removed from a manipulator for easier introduction of a main charge of adhesive into the cavities, and for curing of the introduced adhesive (e.g., introducing the flexure arrangement in the desired orientation and with adhesive within the cavities into an oven for curing the adhesive). This may be useful, for example, in order to provide more rapid through-put during manufacturing, by freeing a manipulator for alignment of additional flexure arrangements even as adhesive of a previously-aligned arrangement is still curing. In other embodiments, however, other approaches are possible. For example, a flexure arrangement can be removed from a manipulator after a main charge of adhesive has been introduced, but before the main charge has cured, or a flexure arrangement can be removed from a manipulator after a main charge of adhesive has partly or fully cured.

Thus, the disclosed embodiments provide improved flexure arrangements and associated methods for securing and aligning optical components. For example, some of the flexure arrangements for optical components and methods described above can advantageously improve the assembly and maintenance of the alignment of optical components, especially for high precision applications, including by reducing the adverse effects on alignment of conventional approaches to secure the flexures in place.

The previous description of the disclosed embodiments is provided to enable any person skilled in the art to make or use the systems and methods of the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The invention claimed is:

1. An optical system comprising:
a receiver that includes a receiver body secured to a first optical component, the receiver further including a first pocket block, a second pocket block, and a third pocket block that extend from the receiver body and include a first pocket, a second pocket, and a third pocket, respectively; and
a flexure arrangement that includes a flexure base secured to a second optical component, the flexure arrangement further including a first flexure, a second flexure, and a third flexure that extend from the flexure base into the first, second, and third pockets, respectively, and are secured therein with adhesive;
each of the first, second, and third pockets being sized to permit adjustment of the corresponding first, second, or third flexure within the pocket along multiple axes before the adhesive has hardened, to adjust an alignment of the first and second optical components relative to multiple degrees of freedom.

2. The optical system of claim 1, wherein the first, second, and third flexures extend substantially perpendicularly from the flexure base and the first, second, and third pocket blocks extend substantially perpendicularly from the receiver body.

3. The optical system of claim 1, wherein each of the first, second, and third pockets has an elongate cross-section perpendicular to an insertion direction for the first, second, and third flexures, respectively, that is configured to adjustably receive a planar portion of the corresponding first, second, or third flexure.

4. The optical system of claim 3, wherein a well is formed within each of the first, second, and third pockets, sized to receive adhesive to provide at least a minimum bond line thickness for the adhesive, to secure the corresponding first, second, or third flexure.

5. The optical system of claim 4, further comprising:
an injection port in fluid communication with at least one of the first, second, or third pockets; and
an opening directed through at least one of the first, second, or third flexures that corresponds with the at least one of the first, second, or third pockets;
wherein the injection port, the opening, and the well of the at least one of the first, second, or third pockets, are aligned for passage of adhesive from the injection port, through the opening, to the well.

6. An optical system comprising:
a receiver secured to a first optical component, the receiver including a receiver body that supports the first optical component and a plurality of slots; and
a flexure arrangement secured to a second optical component, the flexure arrangement including a plurality of flexures, each flexure of the plurality of flexures having a free end that extends away from the second optical component and into a corresponding one of the slots;
each slot of the plurality of slots being sized to receive adhesive that secures the corresponding flexure within the slot when the adhesive has hardened, and to permit adjustment of the corresponding flexure within the slot, before the adhesive has hardened, to adjust an alignment of the first and second optical components relative to multiple degrees of freedom.

7. The optical system of claim 6, wherein the flexure arrangement includes a flexure base with a plurality of second slots;
wherein each flexure of the plurality of flexures includes a second free end that extends into a corresponding one of the second slots; and
wherein each second slot of the plurality of second slots is sized to receive a second adhesive that secures the corresponding flexure within the second slot when the second adhesive has hardened, and to permit adjustment of the corresponding flexure within the second slot, before the second adhesive has hardened, to adjust an alignment of the first and second optical components relative to multiple degrees of freedom.

8. The optical system of claim 6, wherein an internal side wall of at least one of the slots includes one or more of:
a well that receives the adhesive to provide a predetermined minimum bond line thickness for the corresponding flexure within which the corresponding flexure is nested when received in the at least one of the slots; or
a recess within which the corresponding flexure is nested when received in the at least one of the slots.

9. The optical system of claim 6, wherein the receiver includes a plurality of protrusions extending from the receiver body; and
wherein the slots are formed as pockets extending into the protrusions.

10. The optical system of claim 9, wherein the receiver body and the plurality of protrusions are integrally formed.

11. The optical system of claim 10, wherein at least one of the slots is formed as a pocket at least partly defined by a wall member that is secured to the receiver body at a corresponding one of the plurality of protrusions.

12. The optical system of claim 6, wherein open ends of the slots open away from the receiver body.

13. The optical system of claim 6, wherein the flexure arrangement includes a flexure base that is integrally formed with the flexures, the flexure base supporting the second optical component.

14. The optical system of claim 6, wherein at least one of the flexures is a planar flexure.

15. The optical system of claim 14, wherein at least one of the slots, corresponding to the at least one of the flexures, has an elongate cross-section corresponding to an elongate cross-section of the planar flexure.

16. The optical system of claim 15, wherein the receiver is a first receiver, and the plurality of slots is a first plurality of slots, and the free ends of the flexures are first free ends;
wherein the optical system further comprises a second receiver including a second plurality of slots; and
wherein each slot of the second plurality of slots receives a second free end of a a second corresponding one of the flexures, opposite the first free end, and is sized to receive adhesive that secures the corresponding flexure within the slot of the second plurality of slots when the second adhesive has hardened.

17. The optical system of claim 6, wherein at least one of the slots defines a pocket that fully surrounds a perimeter of the corresponding flexure.

18. The optical system of claim 17, wherein a first opening is included on one or more of (i) at least one protrusion on the receiver that corresponds to the at least one of the slots or (ii) at least one of the flexures, the first opening being separate from an open end of the pocket and configured to receive the adhesive during introduction of the adhesive into the pocket.

19. The optical system of claim 18, wherein the first opening is included on one or more of the at least one protrusion on the receiver that corresponds to the at least one of the slots, and wherein the at least one protrusion further includes a second opening, separate from the first opening and the open end of the pocket, to provide visual access to the adhesive within the pocket.

20. An optical system comprising:
a receiver secured to a first optical component, the receiver including a receiver body that supports the first optical component, and a plurality of cavities;
a flexure arrangement secured to a second optical component, the flexure arrangement including a plurality of flexures that extend away from the second optical component to be nested within the cavities;
each cavity of the plurality of cavities:
including adhesive that is hardened to secure the corresponding flexure within the cavity; and
having a cross-section that is larger than a cross-section of the corresponding flexure and a depth in an insertion direction that is larger than an insertion length for the corresponding flexure, so that the corresponding flexure is adjustable relative to multiple degrees of freedom within the cavity, while remaining nested within the cavity, before the adhesive is hardened.

* * * * *

UNITED STATES PATENT AND TRADEMARK OFFICE
CERTIFICATE OF CORRECTION

PATENT NO. : 11,662,601 B2
APPLICATION NO. : 17/089526
DATED : May 30, 2023
INVENTOR(S) : John Filhaber It is certified that error appears in the above-identified patent and that said Letters Patent is hereby corrected as shown below:

In the Claims

Column 25, Claim 16, Line 18, "of a a second corresponding" should be --a corresponding--.

Column 25, Claim 16, Line 20, "receive adhesive" should be --receive a second adhesive--.

Signed and Sealed this
First Day of August, 2023

Katherine Kelly Vidal
*Director of the United States Patent and Trademark Office*